US008601457B1

(12) United States Patent
Han

(10) Patent No.: US 8,601,457 B1
(45) Date of Patent: Dec. 3, 2013

(54) CHECKING FOR ACCESS PROBLEMS WITH DATA STORES

(75) Inventor: Zhi Han, Acton, MA (US)

(73) Assignee: The MathWorks, Inc., Natick, MA (US)

( * ) Notice: Subject to any disclaimer, the term of this patent is extended or adjusted under 35 U.S.C. 154(b) by 837 days.

(21) Appl. No.: 12/404,085

(22) Filed: Mar. 13, 2009

Related U.S. Application Data

(63) Continuation-in-part of application No. 12/171,082, filed on Jul. 10, 2008.

(60) Provisional application No. 61/157,480, filed on Mar. 4, 2009, provisional application No. 61/063,293, filed on Jan. 31, 2008.

(51) Int. Cl.
*G06F 9/46* (2006.01)
*G06F 9/40* (2006.01)

(52) U.S. Cl.
USPC ........... 717/156; 717/154; 717/155; 717/157; 717/158

(58) Field of Classification Search
USPC ......................................................... 717/154
See application file for complete search history.

(56) References Cited

U.S. PATENT DOCUMENTS

| | | | | |
|---|---|---|---|---|
| 5,283,896 A | * | 2/1994 | Temmyo et al. | 718/104 |
| 5,832,272 A | * | 11/1998 | Kalantery | 717/149 |
| 6,457,173 B1 | | 9/2002 | Gupta et al. | |
| 6,470,486 B1 | | 10/2002 | Knapp | |
| 6,857,082 B1 | | 2/2005 | Josan et al. | |
| 7,149,959 B1 | | 12/2006 | Jones et al. | |
| 7,555,418 B1 | | 6/2009 | Qadeer et al. | |
| 8,234,647 B1 | | 7/2012 | Chutinan et al. | |
| 8,280,832 B1 | | 10/2012 | Englehart et al. | |

(Continued)

OTHER PUBLICATIONS

Co-pending U.S. Appl. No. 13/826,812 entitled "Determining Conditions Associated with Accessing Data Stores", by Englehart et al., filed Mar. 14, 2013, 72 pages.

(Continued)

*Primary Examiner* — Kenneth Tang
*Assistant Examiner* — Keith C Yuen
(74) *Attorney, Agent, or Firm* — Harrity & Harrity, LLP

(57) ABSTRACT

In an embodiment, a technique that may be used to identify a pattern with respect to accessing a data store in a model. The pattern may be a desirable, undesirable, anomalous or some other type of pattern with respect to accessing the data store. The technique may include generating an execution control graph that represents an execution of the model. The execution control graph may be analyzed to identify the pattern. Analysis may include generating an expression based on the execution control graph and a condition to test for and determining, based on the expression, if the condition is met. If the condition is met, the pattern may be said to exist in the model. A result may generated based on the analysis and the result may be output.

24 Claims, 20 Drawing Sheets

(56) References Cited

U.S. PATENT DOCUMENTS

| | | |
|---|---|---|
| 2002/0004810 A1 | 1/2002 | Reneris |
| 2002/0095434 A1 | 7/2002 | Lane |
| 2004/0078618 A1 | 4/2004 | Moser et al. |
| 2004/0181543 A1* | 9/2004 | Wu et al. ................ 707/102 |
| 2005/0060647 A1* | 3/2005 | Doan et al. ................ 715/514 |
| 2005/0125789 A1 | 6/2005 | Dijkstra et al. |
| 2006/0122960 A1* | 6/2006 | Suganuma et al. ........... 707/1 |
| 2006/0277392 A1* | 12/2006 | Bittner ........................ 712/25 |
| 2009/0144545 A1* | 6/2009 | Dhuvur et al. ................ 713/165 |

OTHER PUBLICATIONS

Co-pending U.S. Appl. No. 13/632,509 entitled "Proving Latency Associated with References to a Data Store", by Englehart et al., filed Oct. 1, 2012, 74 pages.

Xie et al., Allocation and Scheduling of Conditional Task Graph in Hardware/Software Co-Synthesis, Proceedings of the Conference on Design, Automation and Test in Europe, Mar. 2001, pp. 620-625.

* cited by examiner

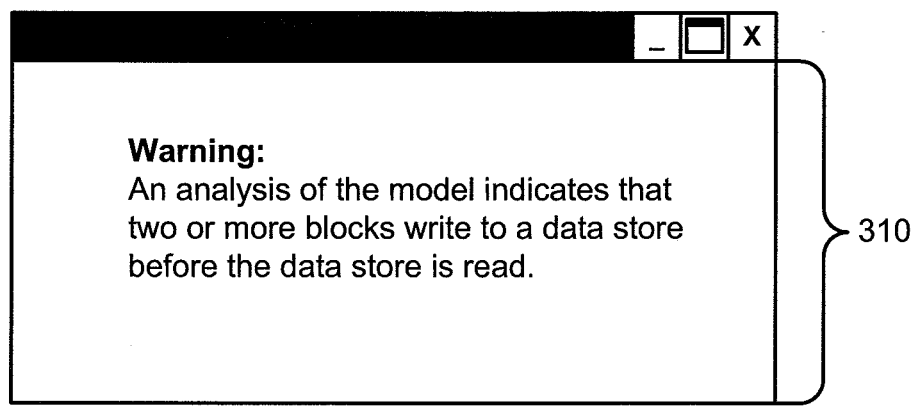
FIG. 3

400 

402 — INPUT: A model $M$ and a set of blocks $B_i$ associated with a data store, $i = 1,...,k$
404 — OUTPUT: Execution graph $G$
406 — PROCEDURE
408 — INITIALIZE_QUEUE
410 — ENQUEUE($B_i$) $i = 1,...,k$
412 — WHILE QUEUE_NOT_EMPTY
    414 — $B$ = DEQUEUE
    416 — IF $B$ is a conditional block
        418 — Find controller blocks $C_i$ of $B$, $i = 1,...,m$
        420 — FOREACH $C_i$
            422 — Add nodes and connections for $C_i$
            424 — ENQUEUE($C_i$) if $C_i$ has not been visited
        426 — END FOREACH
    428 — END IF
    430 — Find blocks $D_i$ that $B$ depends on, $i = 1,...,n$
    432 — FOREACH $D_i$
        434 — Add nodes and connections for $D_i$
        436 — ENQUEUE($D_i$)
    438 — END FOREACH
    440 — Find the parent block $P$ of $B$
    442 — Add nodes and connections for $P$
    444 — IF $P$ is not the root model ENQUEUE($P$)
446 — END WHILE
448 — END PROCEDURE

FIG. 4

CHECKING FOR ACCESS PROBLEMS WITH DATA STORES

RELATED APPLICATIONS

The present application claims the benefit of U.S. Provisional Application No. 61/157,480, titled "CHECKING FOR ACCESS PROBLEMS WITH DATA STORES", which was filed on Mar. 4, 2009, and which is hereby incorporated by reference as though fully set forth herein.

In addition, the present application is a continuation-in-part of U.S. patent application Ser. No. 12/171,082, titled "CHECKING FOR MUTUAL EXCLUSIVENESS OF A SHARED RESOURCE", which was filed on Jul. 10, 2008, and which claims the benefit of U.S. Provisional Application No. 61/063,293, titled "CHECKING FOR MUTUAL EXCLUSIVENESS FOR A SHARED RESOURCE", which was filed on Jan. 31, 2008, both of which are also hereby incorporated by reference as though fully set forth herein.

BACKGROUND

Modeling environments may include textual modeling environments and/or graphical modeling environments that may be used to generate, compile, and/or execute one or more models that represent systems. Modeling environments may cater to various aspects of dynamic system simulation, synthesis, analysis and design. Such modeling environments may allow users to perform numerous types of tasks including, for example, constructing and simulating system models.

Some models may include one or more data stores that are accessed by multiple portions of the model. Data stores may be beneficial in that the may enable a sharing of information between portions of the model. However, in some circumstances using a data store may introduce problems. For example, a portion of the model may read the data store before it is written (e.g., initialized) and consequently read unwanted (e.g., uninitialized) information. Likewise, for example, a portion of the model may write to the data store multiple times before the data store is read and consequently wanted information may be lost.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 3 illustrates an example of a dialog box that may be displayed to indicate a model analysis result;

FIG. 4 illustrates pseudo-code of example acts that may be used to generate an execution control graph;

DETAILED DESCRIPTION

The following detailed description refers to the accompanying drawings. The same reference numbers in different drawings may identify the same or similar elements. Also, the following detailed description does not limit the invention.

One or more embodiments of the invention may be implemented on one or more computer systems. The computer systems may include, for example, a desktop computer, a laptop computer, a client computer, a server computer, a mainframe computer, a personal digital assistant (PDA), a web-enabled cellular telephone, a smart phone, a smart sensor/actuator, or some other computation and/or communication device.

Figure 1:
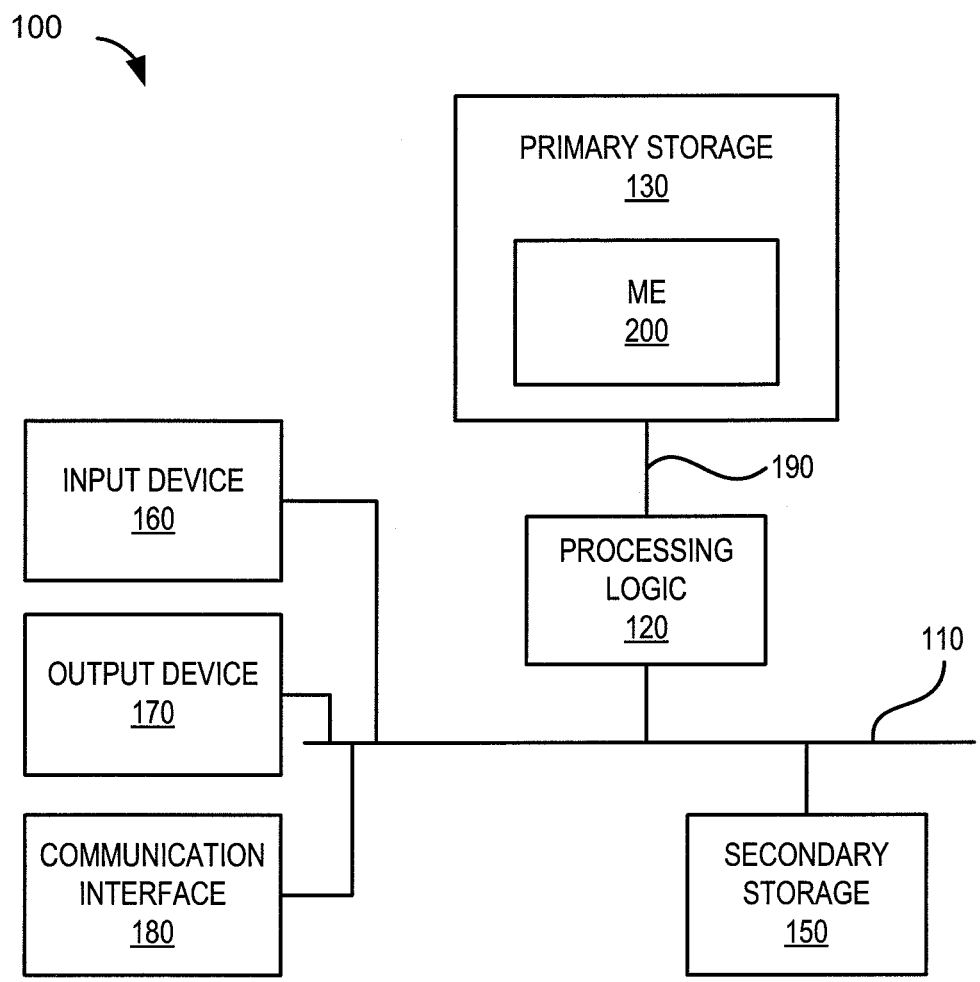
FIG. 1 illustrates an example of a computer system that may be configured to implement one or more embodiments of the invention.

FIG. 1 illustrates an example of a computer system 100 that may be configured to implement one or more embodiments of the invention. Referring to FIG. 1, the computer system 100 may comprise one or more components including an input-output (I/O) bus 110, processing logic 120, a primary storage 130, a secondary storage 150, an input device 160, an output device 170, a communication interface 180, and a memory bus 190. Note that computer system 100 is an example of a computer system that may be configured to implement one or more embodiments of the invention. It should be noted that other computer systems that may be less complicated or more complicated than computer system 100 may be configured to implement one or more embodiments of the invention.

The I/O bus 110 may be an interconnect bus configured to enable communication among various components in the computer system 100, such as processing logic 120, secondary storage 150, input device 160, output device 170, and communication interface 180. The communication may include, among other things, transferring information (e.g., data and control information) between the components.

The memory bus 190 may be an interconnect bus configured to enable information to be transferred between the processing logic 120 and the primary storage 130. The information may include instructions and/or data that may be executed, manipulated, and/or otherwise processed by processing logic 120. The instructions and/or data may include instructions and/or data that are configured to implement one or more embodiments of the invention.

The processing logic 120 may include logic configured to interpret, execute, and/or otherwise process information contained in, for example, the primary storage 130 and/or secondary storage 150. The information may include instructions and/or data configured to implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. The processing logic 120 may comprise a single core or multiple cores. An example of a processor that may be used to implement processing logic 120 is the Intel® Xeon® processor available from Intel Corporation, Santa Clara, Calif.

The secondary storage 150 may be a computer-readable media that is accessible to the processing logic 120 via I/O bus 110. The secondary storage 150 may be configured to store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, flash drive, etc. The information may be stored on one or more computer-readable media contained in the storage device. Examples of media that may be contained in the storage device may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

The input device 160 may include one or more mechanisms that may permit information to be input into the computer system 100. The information may be supplied by a user. The input device 160 may include, for example, a keyboard, multi-point input device, touch sensitive display, biometric sensing device, computer mouse, trackball, accelerometer, gyroscope, camera, microphone, neural interface, pen-based pointing device, haptic device, or other input device.

The output device 170 may include one or more mechanisms that may output information from the computer system 100. The output device 170 may include logic that may be directed by, for example, the processing logic 120, to output the information from the computer system 100. The output device 170 may include, for example, a cathode ray tube (CRT), plasma display, light-emitting diode (LED) display, liquid crystal display (LCD), vacuum florescent display (VFD), surface-conduction electron-emitter display (SED), field emission display (FED), haptic device, tactile device, printer, speaker, or other output device.

The communication interface 180 may include logic configured to interface the computer system 100 with, for example, a communication network and enable the computer system 100 to communicate with entities connected to the network. An example of a computer network that may be used with computer system 100 will be described further below with respect to FIG. 13.

The communication interface 180 may include a transceiver-like mechanism that enables the computer system 100 to communicate with the entities connected to the network. The communication interface 180 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computer system 100 to the network.

The primary storage 130 may comprise one or more computer-readable media configured to store information for processing logic 120. The primary storage 130 is accessible to the processing logic 120 via bus 190. Information stored by primary storage 130 may include computer-executable instructions and/or data that are configured to implement ME 200. The instructions may be executed, interpreted, and/or otherwise processed by processing logic 120. ME 200 may be a modeling environment (e.g., a graphical modeling environment) configured to implement one or more embodiments of the invention. An example implementation of ME 200 will be described further below with respect to FIG. 2.

The primary storage 130 may comprise a RAM that may include RAM devices configured to store information stored in primary storage 130. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magnetoresistive RAM (MRAM) devices, phase change memory RAM (PRAM) devices, or other types of RAM devices.

Figure 2:
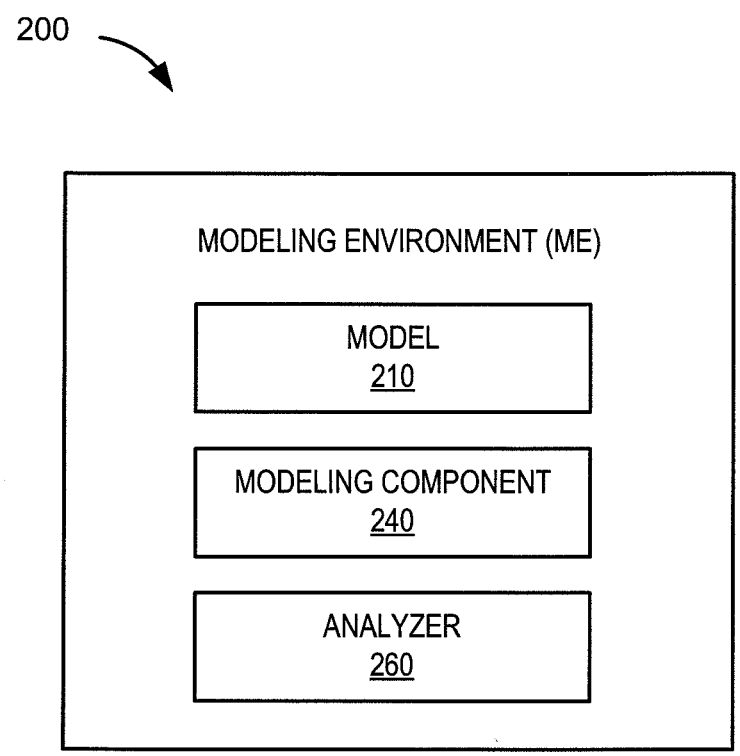
FIG. 2 illustrates an example of a modeling environment (ME) that may be configured to implement one or more embodiments of the invention.

FIG. 2 illustrates an example implementation of ME 200. Referring to FIG. 2, the ME 200 may comprise various components including model 210, modeling component 240, and analyzer 260. As will be described further below, ME 200 may be configured to construct model 210, and analyze the model 210 to identify one or more patterns associated with accessing a data store associated with the model 210. The one or more patterns may be, for example, desirable, anomalous, and/or undesirable or some other type of pattern. A result may be generated that indicates whether a pattern has been identified and the result may be output (e.g., displayed, printed, stored, etc.). Moreover, as will be described further below, a display of model 210 (e.g., a graphical block diagram display) which may be provided by ME 200 may be altered based on one or more identified patterns.

The ME 200 may include hardware-based and/or software-based logic configured to provide a computing environment that may allow, for example, a user to perform tasks related to disciplines, such as, but not limited to, mathematics, science, engineering, medicine, business, biology, finance, and so on. The ME 200 may include a dynamically-typed programming language (e.g., the MATLAB® M language) that can be used to express problems and/or solutions in mathematical notations.

For example, the ME 200 may use an array as a basic element, where the array may not require dimensioning. These arrays may be used to support array-based programming where an operation can apply to an entire set of values included in the arrays. Array-based programming may allow array-based operations to be treated as a high-level programming technique that may allow, for example, operations to be performed on whole aggregations of data without having to resort to explicit loops of individual non-array operations.

In addition, the ME 200 may be configured to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The ME 200 may further provide mathematical functions and/or graphical tools or blocks (e.g., for creating plots, surfaces, images, volumetric representations, or other representations). The ME 200 may provide these functions and/or tools using toolboxes (e.g., toolboxes for signal processing, image processing, data plotting, and/or parallel processing). In addition, the ME 200 may provide these functions as block sets. The ME 200 may also provide these functions in other ways, such as via a library, local or remote database, and so on.

The ME 200 may include a graphical-based environment. The ME 200 may include provisions configured to create, compile, execute, and/or interpret models, such as model 210. A model may be graphical and may be executable (e.g., an executable block diagram model).

MEs that may be used with one or more embodiments of the invention may include, for example, Simulink®, Stateflow®, and SimEvents™ from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL), etc.); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; and Ptolemy from the University of California at Berkeley.

Model 210 may be, for example, a time-based graphical block diagram model, a state transition diagram, a discrete event model, an activity diagram, a UML diagram, a sequence diagram, a data flow model, or some other type of model or diagram. Model 210 may be configured to represent a system. Model 210 may be graphical, textual, or some combination of graphical and textual. The system represented by model 210 may be dynamic, linear, non-linear, or some other type of system. A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing, nuclear reactors, and a stock market.

A dynamic system may be modeled by the model 210 in the ME 200 as a set of differential, difference, and/or algebraic equations. At a given instant of time, these equations may be viewed as relationships between the system's output response ("outputs"), the system's input stimuli ("inputs") at that time, the current state of the system, the system parameters, and time. The state of the system may be thought of as a numerical representation of a dynamically changing configuration of the system.

Model 210 may be executable. The system represented by model 210 may have various execution semantics that may be represented in model 210 as a collection of modeling elements, often referred to as blocks. A block may generally refer to a portion of functionality that may be used in the model 210. The block may be graphically represented, however, it can be appreciated that the block does not necessarily need to be represented graphically. For example, the block may be represented textually or stored in some form of internal representation. Also, a particular visual depiction used to represent the block, for example in a graphical block diagram, is generally an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model. The model designer 240 may be configured to allow subsystem blocks to be selected and opened to present its content to view sub-blocks that make up the subsystem block.

A block may be associated with one or more run-time methods which may include methods that may be configured to output information, update state associated with a model, compute or process derivatives, or perform other functions. The methods may provide a means by which the model is executed by an ME, such as ME 200. The methods may be responsible for (1) writing variables, associated with the model, which may be referred to as signals, (2) advancing states associated with the model, and/or (3) some other function. The methods may be executed by the ME in a simulation loop, by type, using block execution lists. A block execution list may list an order in which blocks may be executed when the model is executed. Execution of a block may include performing one or more run-time methods associated with the block.

A block may represent an elemental dynamic system that may be part of model 210. The block may be associated with a series of one or more system equations that represent a behavior of the elemental dynamic system. Note that the term "block", as used herein, is not limited to referring to a modeling element that represents an elemental dynamic system but may also include other modeling elements, such as modeling elements that may aid in a readability and modularity of block diagrams (e.g., virtual blocks).

Blocks in a block diagram may be virtual or non-virtual. A non-virtual block may influence equations used to model a dynamic system. Virtual blocks, on the other hand, typically do not affect the equations used to model the dynamic system. In other words, virtual blocks often wield no semantic influence on the model from a mathematical perspective. Rather, virtual blocks are often used to help improve the readability and modularity of a block diagram of a model. Examples of virtual blocks may include Simulink® virtual sub-system blocks, input port (inport) blocks, output port (outport) blocks, bus creator blocks, "from" blocks, and "goto" blocks.

The blocks may be interconnected by graphical lines that may represent signals. A signal may represent an input and/or an output of an elemental dynamic system represented by a block. Signals may correspond to time-varying quantities represented by a line connection to or from the block and may have values at various time instants during a simulation of a model, such as model 210. A source block of a signal may write to the signal at a given time instant when the source block's system equations are solved. A destination block of the signal may read the signal when the destination block's system equations are being solved.

Model 210 may include time-based relationships between signals and various state variables representative of the dynamic system modeled by model 210. A solution (e.g., computation of system response) of model 210 may be obtained by evaluating these relationships over time, where the time may start at a predetermined "start time" and end at a predetermined "stop time" or the evaluation may proceed indefinitely. An evaluation of the relationships may be interrupted or terminated by, for example, user interaction. For a class of systems, an evaluation of the relationships may be referred to as a time-step of execution of model 210. Signals may represent quantities that change over time, and these quantities may be defined for various points in time of the block diagram's evaluations. Relationships between signals and state variables may be defined by sets of equations associated with blocks that make up model 210. These equations may define a relationship between the input signals, output signals, state, and time. The blocks may also be associated with parameters, which may be coefficients of the equations.

It should be noted that model 210 may not only be used to represent time-based dynamic systems but also may be used for other models of computation. For example, model 210 may be used to represent a flowchart that may be used to capture a process flow. Model 210 may also be used to describe a programming paradigm (e.g., a data flow paradigm) where an availability of data (often thought of as tokens) may be used to initiate an execution of blocks. Here, a block may represent an operation and a line may represent an execution dependency describing a direction of data flowing between blocks.

Model 210 may be configured to implement one or more functions associated with the system represented by model 210. The functions may be associated with one or more components of the system and may be configured to implement relationships between the components and behaviors of the components within the modeled system. The functions may be implemented in software that may include code and/or data. The software may be written in a language that may be a computer language (e.g., C, C++, Java), an array-based language and/or dynamically typed language (e.g., MATLAB® M-Code), or some other type of language. The language may be configured to support various programming paradigms, such as imperative programming, declarative programming, or some other programming paradigm. The software may be compiled, interpreted, and/or executed by the ME 200.

Modeling component 240 may contain computer-executable instructions and data that are configured to perform various tasks including (1) constructing model 210, for example, through a graphical user interface (GUI); (2) allowing an augmentation of a pre-defined set of blocks with custom user-specified blocks that may be associated with model 210; (3) using model 210 to compute and trace a temporal evolution of outputs associated with a dynamic system represented by the model 210; and (4) automatically producing, for example, deployable software systems, and descriptions of hardware systems that mimic a behavior of either the entire model 210 or portions of model 210. The blocks may be represented in a graphical representation (e.g., a block diagram) of the model that may be presented by the ME 200 to, for example, a user.

The modeling component 240 may include a block diagram editor and an execution engine (not shown). The block diagram editor may be configured to allow, for example, a user, to specify, edit, annotate, save, publish, and print a block diagram of model 210 comprising one or more blocks.

The execution engine may be configured to enable a computation and/or tracing of a dynamic system's outputs from model 210. The execution engine may carry out the task of compiling and linking the block diagram to produce an "in-memory executable" version of model 210 that may be used for simulating, verifying, generating code, trimming, or linearizing the model 210.

Compiling may include checking an integrity and validity of block interconnections in the block diagram. At this stage, the execution engine may also sort the blocks in the block diagram into hierarchical lists that may be used when creating block execution lists. Linking may include using a result of the compiled stage to allocate memory needed for an execution of the various components of the model 210. Linking may also include producing block execution lists that are used, for example, by a simulation or linearization of model 210. Included within the link stage may be an initialization of model 210 which may include an evaluating of "setup" methods (e.g. block start, initialize, enable, and constant output methods). The block execution lists may be generated because the simulation and/or linearization of the model 210 may execute block methods by type (not by block) when they have a sample hit.

The analyzer component 260 may include computer-executable instructions that are configured to implement various acts that may allow model 210 to be analyzed on computer system 100 in accordance with one or more embodiments of the invention. Examples of these acts will be described further below with respect to FIGS. 4, 5, and 6. An example of an analyzer component that may be adapted to incorporate one or more embodiments of the invention includes the Simulink® Design Verifier™, which is available from The MathWorks, Inc.

As will be described further below, analyzing model 210 may include, inter alia, analyzing an execution control graph that represents an execution of the model to identify one or more patterns (access patterns) associated with accessing a data store associated with model 210. As noted above, these patterns may be anomalous, undesirable, desirable, or some other type of pattern. These patterns may include, for example, whether a data store is read by model 210 before the data store is written and/or vice-versa, and/or written multiple times before it is read and/or vice-versa by model 210.

A data store may include anything that can hold data in a computing device. For example, a data store can be a datum, data this is passed between functions in a model, a database, a repository, a stack, a heap, a location in a memory, a register, a queue, etc. Data held by the data store may be encrypted, compressed, etc. Moreover, the data store may be non-volatile, volatile, etc.

The data store may be represented in a model by one or more entities (e.g., one or more blocks). An entity that writes to the data store may be referred to as a writer. An entity that reads from the data store may be referred to as a reader. For example, a data store may be represented as a block in a graphical block diagram model of a system. The model may further contain a first block that writes a value to the data store (a writer) and a second block that reads the value (a reader) written by the first block.

An analysis of model 210 may reveal certain patterns (e.g., read and/or write patterns) in model 210 with respect to accessing a data store associated with model 210 that may be considered, for example, desirable, undesirable, and/or anomalous. For example, an anomalous and/or undesirable pattern may include a pattern where a reader in model 210 reads the data store before the data store is written by a writer in model 210. Likewise, for example, an anomalous and/or undesirable pattern may include a pattern where the data store is written more than once by one or more writers in model 210 prior to being read by a reader in model 210. These and other patterns may be identified in accordance with techniques described below.

FIG. 3 illustrates an example of a dialog box 300 that may be displayed to indicate a result of analyzing model 210. Referring to FIG. 3, the dialog box 300 contains text 310 that indicates an undesirable and/or anomalous read and/or write pattern that was identified in the analysis of model 210. In this example, the undesirable and/or anomalous read and/or write pattern that was identified was that the data store was being written by two or more blocks prior to being read.

It should be noted that FIG. 3 is one example of outputting a result associated with an analysis of a model to identify certain patterns associated with accessing a data store associated with the model. Other techniques may be used instead of or in addition to the above. For example, as will be described further below, outputting the result may include transforming a display of the model (e.g., a graphical block diagram display of the model) to display a portion of the model, that is associated with the identified pattern, differently (e.g., through highlighting, coloring, flashing) than other portions of the model that are not associated with the identified pattern. Moreover, modalities other than display may be used to output a result. For example, the result may be stored in a storage, such as primary storage 130 and/or secondary storage 150. In addition, the result may be out using, e.g., audio. Here, the result may be outputted as spoken natural language that may be synthesized.

As will be described further below, analysis of a model to determine if the model contains certain patterns with respect to accessing a data store associated with the model may include (1) generating an execution control graph and (2) analyzing the execution control graph. Analyzing the execution control graph may involve (1) generating an expression based on the execution control graph and condition to be tested for, where the condition to be tested for represents one or more patterns to be identified, and (2) determining, based on the expression, whether the condition is met. A result that indicates whether the model contains a certain pattern with respect to accessing the data store may be generated based on whether the condition is met.

Various notations used herein are to represent various operations. Table 1, illustrates these notations and their associated operations.

TABLE 1

Notations of Operations

| Notation | Operation |
|---|---|
| → | Implies |
| ↔ or iff | If and only if |
| ∈ | Is an element of |
| ∧ | Logical AND |
| ∨ | Logical OR |
| ¬ | Logical NOT |
| ⊆ | Is a subset of |

An execution control graph may be used to represent an execution sequence of one or more blocks in a model. The execution control graph may be a directed graph that contains one or more nodes where a node may correspond to one or more blocks contained in the model. The nodes may be connected in the execution control graph using one or more directed edges which may be used to indicate an execution relationship between the nodes. The directed edges may be shown as arrows which may be used to indicate a flow of execution through the graph. An edge from a first node to a second node may indicate that the second node is dependent on the execution of the first node. Examples of models and execution control graphs that may be generated from the models will be described further below with respect to FIGS. 7A-B, 8, 9A-D, 10, 11A-D, and 12.

Other relationships may be illustrated in the graph such as parent-child relationships between blocks in the model. A parent-child relationship deals with a hierarchical structural relationship of blocks in the model. For example, as noted above, a subsystem block may contain one or more sub-blocks. The relationship between the subsystem block and the sub-blocks may be one of a parent-child relationship where the subsystem block is the parent block and the sub-blocks are children of the parent block.

An execution control graph G may be a directed graph that is defined as follows:

$G=(V,E)$ where

V is a set of nodes such that:
  there is a unique node $v_0 \in V$ that represents the model
  for any $v \in V$, $v \neq v_0$ there is a unique corresponding block in M $E \subseteq V \times V$ is a set of edges and can be written $v_1 \rightarrow v_2$ iff($v_1$, $v_2) \in E$, which can be any one of the following classes of edges:
  $v_1 \rightarrow v_2$ if $v_2$ corresponds to a conditional subsystem block and $v_1$ correspond to its controller block (control relationship)
  $v_1 \rightarrow v_2$ if the block corresponding to $v_2$ is algebraically dependent on the block corresponding to $v_1$ (data dependency relationship)
  $v_1 \rightarrow v_2$ if $v_1$ corresponds to a subsystem block and $v_2$ corresponds to a block inside the subsystem (parent-child relationship).

Each node in G may correspond to a block in the model. G may represent a subset of blocks within the model. Doing so may constrain analysis to a subset of blocks and may avoid potential computational complexity that may be associated with large-scale models. G may be created for a specific problem in the model and the problem may be a run-time problem.

FIG. 4 illustrates pseudo-code 400 of example acts that may be used to generate an execution control graph that represents an execution of a model, such as model 210. The acts may be implemented on a computer system, such as computer system 100. Referring to FIG. 4, at line 402, inputs to the pseudo-code include the model M and a set of one or more blocks $B_i$ associated with a data store in the model M. Note that one or more blocks in $B_i$ may be subsystem blocks that include subsystems. At line 404, an output of the pseudo-code is an execution control graph G.

A pseudo-code procedure that generates graph G begins at line 406 and ends at line 448. At line 408, a queue is initialized to a known state. The queue may be, for example, a first-in-first-out (FIFO) queue and may be initialized to an "empty" state. At line 410, the blocks $B_i$ are enqueued (placed) in the queue. A "while" loop that begins at line 412 and ends at line 446 is performed for each block $B_i$ that has been placed in the queue.

Inside the "while" loop, at line 414, a block B is dequeued (removed) from the queue. Block B may be dequeued, for example, from the end of the queue. At line 416, an IF statement is used to check whether block B is a conditional block. A conditional block is illustratively a block in a model that may conditionally execute. A condition that may cause the block to execute may be the presence or absence of a control signal that may be provided, for example, by a controller block. An example of a conditional block will be described further below.

If at line 416, it is determined that block B is a conditional block, at line 418, one or more controller blocks C that control execution of block B are identified. At lines 420-426, each controller block $C_i$, is processed. Specifically, for each controller block $C_i$, at line 422, a node and appropriate connections (edges) are added to graph G to represent the controller block and its execution relationship with respect to other blocks in the model. In addition, if the controller block $C_i$ has not been previously visited, the controller block is placed on the queue (line 424). Line 428 indicates an end of the IF statement at line 416.

At line 430, one or more dependent blocks D of block B (if they exist) are found. A dependent block $D_i$ of block B is a block of which B is dependent on for, e.g., a signal, state, event, function call, or other entity. In other words, in may be said that $D_i \rightarrow B$. A dependent block $D_i$ is processed at lines 432-438. Specifically, at line 434, a node and edges associated with the dependent block $D_i$ is added to graph G. At line 436, the dependent block $D_i$ is placed on the queue.

At line 440, a parent block P (if it exists) is identified for B. At line 442, a node and appropriate edges are added for the identified parent block P. At line 444, a check is performed to determine if P is the root of the model. If not, P is placed on the queue. The "while" loop at lines 412-446 is repeated until the queue is empty.

Figure 5:
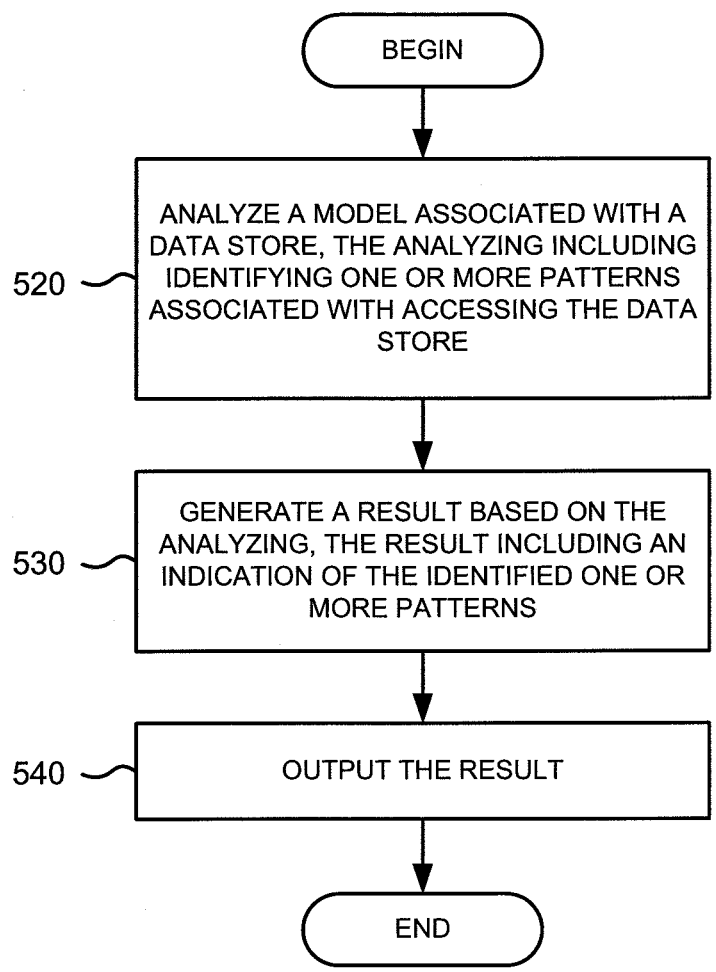
FIG. 5 illustrates a flowchart of example acts that may be used to analyze a model to identify one or more patterns associated with accessing a data store associated with the model.

FIG. 5 illustrates a flowchart of acts that may be used to identify one or more patterns associated with accessing a data store associated with a model, such as model 210. The acts may be implemented on a computer system, such as computer system 100. Referring to FIG. 5, at block 520, the model is analyzed to identify one or more patterns associated with accessing the data store. The patterns may be desirable, undesirable, and/or anomalous read and/or write patterns associated with accessing the data store. For example, the patterns may include writing the data store more than once prior to reading the data store or vice-versa, reading the data store prior to writing the data store or vice-versa, and so on. The analysis may involve generating an execution control graph that represents an execution of the model and analyzing the execution control graph to identify the patterns associated with accessing the data store. As noted above, analyzing the execution control graph may include (1) generating an expression based on the execution control graph and a condition to test for where the condition to test for represents a pattern associated with accessing the data store, and (2) determining, based on the expression, if the condition is met (e.g., the expression is satisfiable). If the condition to test for is met, the pattern has been identified (i.e., exists) in the model. Otherwise, if the condition is not met, the pattern has not been identified (i.e., does not exist) in the model.

At block 530, a result is generated based on the analyzing performed at block 520. The result may include an indication of the identified one or more patterns. The result may be a flag, a return value, a data structure, a log, text, graphics, an exception code, audio, and so on, that indicates whether a particular pattern exists with respect to accessing the data store. For example, the result may be a GUI, such as GUI 300, that indicates a type of pattern that exists (e.g., two or more blocks write to the data store before the data store is read). Likewise, for example, the result may be a data structure that indicates (1) a type of the pattern that exists and (2) one or more blocks in the graphical model that are involved in pattern. For example, the pattern may be whether the data store is read before it is written and blocks involved in the pattern may include one or more blocks that read the data store before the data store is written.

At block 540 the result is output. The result may be output by displaying the result, storing the result, generating information based on the result and displaying or storing the generated information, generating an exception condition or other event, synthesizing spoken information, and so on. For example, as noted above, a GUI may be generated based on the result and the GUI displayed. Likewise, as noted above, the pattern may be indicated in a display of the model. For example, a graphical block diagram display of the model may be transformed to display blocks associated with the pattern differently than other blocks that are not associated with the pattern. Here, in the transformed display, blocks that are associated with the pattern may be, for example, highlighted and/or colored differently than other blocks that are not associated with the pattern.

Figure 6:
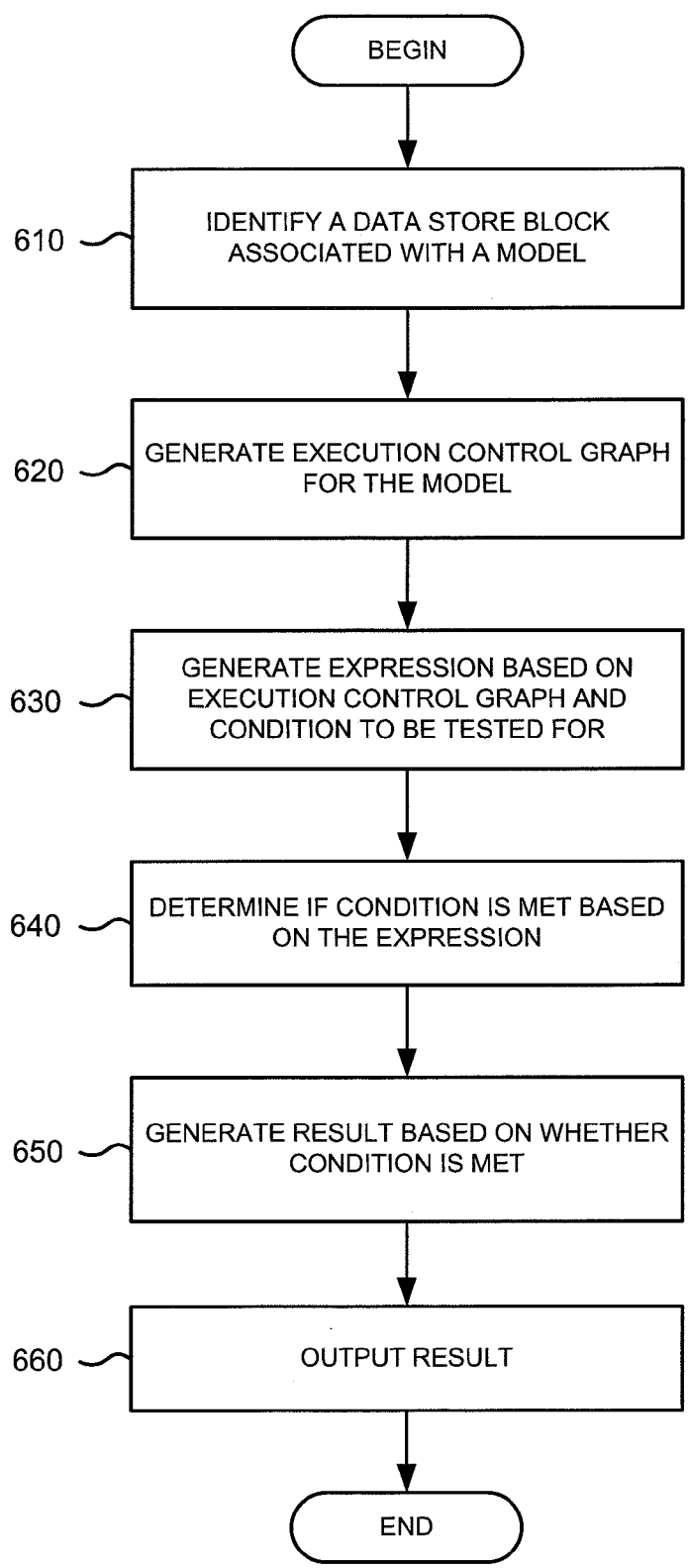
FIG. 6 illustrates a flowchart of example acts that may be used to generate and analyze an execution control graph associated with an execution of a model to identify one or more patterns associated with accessing a data store associated with the model.

FIG. 6 illustrates a flowchart of acts that may be used to analyze a model, such as model 210, to identify one or more patterns associated with accessing a data store associated with the model. The acts may be implemented on a computer system, such as computer system 100. The patterns may be identified using an execution control graph. Referring to FIG. 6, at block 610, a data store associated with the model is identified. The data store may be identified, for example, by examining blocks associated with the model block-by-block and checking information (e.g., properties, attributes, etc.) associated with the blocks to determine if the block implements a data store. Here, each block associated with the model may be associated with an identifier that identifies the type of block. An identifier associated with a block may be examined to determine if the identifier indicates the block is a data store block that implements a data store.

At block 620, an execution control graph is generated for the model. As noted above, the execution control graph represents an execution of the model. The execution control graph may be generated as described above with respect to FIG. 4.

At block 630, an expression (e.g., a Boolean expression) is generated based on the execution control graph and a condition to be tested for. The condition to be tested for may include whether a certain pattern (e.g., a desirable, undesirable, or anomalous read and/or write pattern) exists in the model with respect to accessing the data store. For example, the condition to be tested for may include whether the data store is read by a reader in the model before it is written, and/or vice-versa. Likewise, for example, the condition to be tested may include whether the data store is written multiple times before it is read and/or vice-versa.

The expression may include a relationship of an execution status of one or more blocks corresponding to the execution control graph at some point in a simulation of the model. Suppose for an execution control graph given as G=(V, E), for each node $v \in V$, a variable $v_S$ is true if a block corresponding to v has started execution. Another variable $v_E$ is true if the execution of the block has ended. Table 2, illustrates a truth-table of status for variables $v_S$ and $v_E$ with respect to a given block.

TABLE 2

Status of $v_S$ and $v_E$ for a Given Block

| $v_S$ | $v_E$ | Block Status |
|---|---|---|
| FALSE | FALSE | Block execution has not started |
| TRUE | FALSE | Block execution has started but not completed |
| TRUE | TRUE | Block execution is completed |
| FALSE | TRUE | Block is disabled |

For an edge e∈E, that corresponds to a signal in the model, if the edge corresponds to a data dependency, it may be represented by a variable $e_R$ where $e_R$ is true iff a signal corresponding to e is already outputted by the block generating the signal or the block is disabled. If the edge corresponds to a control signal generated by a controller block, two variables $e_R$ and $e_A$ may be associated with the edge where $e_A$ is true iff $e_R$ is true and the controller block sends an activation signal, e.g., function-call, action, trigger signal, etc. Table 3 illustrates a truth-table of variables that correspond to a status of a control signal.

TABLE 3

Status of $e_R$ and $e_A$ for a Given Block

| $e_R$ | $e_A$ | Control Signal Status |
|---|---|---|
| FALSE | FALSE | Control signal not ready |
| TRUE | FALSE | Control signal is deactivate signal |
| TRUE | TRUE | Control signal is activate signal |
| FALSE | TRUE | Undefined |

The following are Boolean expressions that may be used to specify conditions for execution of each node v∈V.

A block may execute if its dependent data inputs are ready. For any edge i=(u, v)∈E for some u and the edge e corresponds to data signals, $v_S \rightarrow i_R$.

A block may typically only execute if its parent block is in execution and the parent block may end execution if the execution of the parent's children blocks has ended. For any edge (p, v)∈E that edge (p, v) is a parent-child edge, $(v_S \rightarrow p_S) \wedge (p_E \rightarrow v_E)$.

A block may be disabled if its parent is disabled. For any edge (p, v)∈E that the edge (p, v) is a parent-child edge, $(\neg v_S \wedge v_E) \leftarrow (\neg p_S \wedge p_E)$.

An output of a block may be ready when the block completes execution or when the block is disabled. For any edge o=(v, u)∈E for some u and the edge o corresponds to a data signal, $o_R \leftrightarrow v_E$.

A controller block may be a block that controls execution of another block in a model. Expressions for controller blocks follow.

For controller blocks that implement if-else or switch-case logic, at most one of the output control signals may be active. For a pair of edges $e_1=(v, v_1)$ and $e_2=(v, v_2)$ where v corresponds to a block implement an if-else or switch-case, $\neg e_{1A} \vee \neg e_{2A}$.

Each control signal may only be active when the signal is ready. For an edge e that corresponds to a control signal, $e_A \rightarrow e_R$.

Each control signal may only be ready when the controller block has started its execution. For an edge e=(v, u)∈E that corresponds to a control signal, $e_R \rightarrow v_S$.

For other types of controller blocks, such as function-call blocks, generator blocks, special Boolean expressions may not be specified. Hence these controller blocks may output other control signals. Function-call blocks may represent function-call subsystems. A function-call subsystem is a subsystem that may be enabled using a function call.

The following Boolean expression may be used for subsystems and the root model. Assume, for example, that at any point in time, only one of the blocks in the subsystem is actively executing. For each pair u, w such that (v, u)∈E and (v, w)∈E and both edges correspond to a parent-child relationship between blocks, $\neg w_S \vee \neg u_S \vee w_E \vee u_E$. The root model may always execute. This may be represented by the expression $v_0$.

Conditional subsystems are subsystems that are enabled based on some condition. Expressions that may be used for conditional subsystems follow.

The following expression may be used for function-call or action subsystems, where the subsystem is enabled (i.e., it can execute because a control signal is active). For an edge e=(c, v) that corresponds to an incoming control signal, $e_A \leftrightarrow v_S$. In situations where a function-call block or action subsystem block is disabled because, for example, the block cannot execute, the block's control signal is inactive, or the block is disabled because its parent is disabled, the following expression may be used, $(\neg v_S \wedge v_E) \rightarrow ((\neg p_S \wedge p_E) \vee \neg c_A)$.

For an enabled subsystem or triggered subsystem, the subsystem may execute when an enable or trigger signal, respectively, is active. For an edge e=(c, v) that corresponds to an incoming enable or trigger signal, $v_S \rightarrow e_A$. The enabled subsystem or trigger subsystem may be disabled if the enable or trigger signal, respectively, is not present or a parent system is disabled. In this situation the following expression may be used, $(\neg v_S \wedge v_E) \rightarrow ((p_S \wedge p_E) \vee \neg c_A)$. The enabled subsystem or trigger subsystem may have executed if the parent system is enabled. In this case, the following expression may be used, $(p_S \wedge p_E \wedge c_A) \rightarrow v_S$.

The condition to be tested for may likewise be expressed as a Boolean expression. The Boolean expression may be expressed such that if it is satisfied, the condition to be tested for exists (i.e., is met). Following are example conditions that may be tested for and Boolean expressions that may be used to test for these conditions.

One example condition that may be tested for is whether it is possible for a particular data store read (DSR) block to start its execution when a related data store write (DSW) block has not executed. An expression that may be used to represent this condition may be stated as follows. Suppose dsr∈V that corresponds to the DSR block and dsw∈V that corresponds to the DSW block. The condition to test for may be expressed as $dsr_S \wedge dsr_E \wedge \neg dsw_S$.

Another example condition that may be tested for may be whether it is possible for a first DSW block and a second DSW block to execute within a same time-step of execution of a model or evaluation of the model. This condition may be represented as follows. Suppose $dsw_1 \in V$ and $dsw_2 \in V$ and that $dsw_1$ and $dsw_2$ correspond to the first DSW block and the second DSW block, respectively. The condition to test for may be expressed as $dsw_{1S} \wedge dsw_{1E} \wedge dsw_{2S} \wedge dsw_{2E}$.

Returning to block 630 (FIG. 6), the expression generated, based on the execution control graph and a condition to be tested for, may be a conjunction of (1) Boolean expressions that represent various nodes and edges in the execution control graph and (2) the condition to be tested for. The expression may be in a normal form, such as a conjunctive normal form (CNF). Note that the expression may be in other forms, such as, for example, disjunctive normal form (DNF).

At block 640, a determination is made as to whether the condition to be tested for is met. This determination may involve determining whether the conjunction is satisfiable by solving a satisfiability (SAT) problem associated with the conjunction. The SAT problem may be stated as follows: expressing the conjunction as a Boolean expression $f(x_1, \ldots, x_n)$, is there an assignment of $x_1, \ldots, x_n$ such that f is satisfied (e.g., a logical TRUE). If such an assignment exists, the conjunction may be considered satisfiable and the model may be said to contain the pattern that is represented by the condition to be tested for. If no such assignment exists, the conjunction may be considered not satisfiable and the model may be said to not contain the pattern. An exhaustive search may be performed to determine whether such an assignment exists.

At block 650, a result is generated based on whether the condition is met (e.g., the expression is satisfiable, not satisfiable, etc.). The result may include an indication of whether the model includes the identified pattern. As noted above, the result may be, for example, a flag, a return value, a data structure, a log, text, graphics, audio, an updated block execution list, an exception code, and so on.

At block 660, the result is output. As noted above, the result may be output by displaying the result, storing the result, generating information based on the result and displaying or storing the information, generating an exception condition or other event, and so on. For example, as noted above, a GUI may be generated based on the result and the GUI displayed. Likewise, as noted above, portions of a graphical model associated with the result may be displayed differently than other portions of the graphical model. For example, a portion of a graphical model that is associated with an identified undesirable and/or anomalous read and/or write pattern may be highlighted and/or colored differently than other portions of the graphical model that are not associated with the identified undesirable and/or anomalous read and/or write pattern. Moreover, some or all of the execution graph may be displayed where, for example, one or more portions of the displayed execution graph that are associated with the pattern may be displayed different than other portions of the displayed execution graph.

Figure 7A:
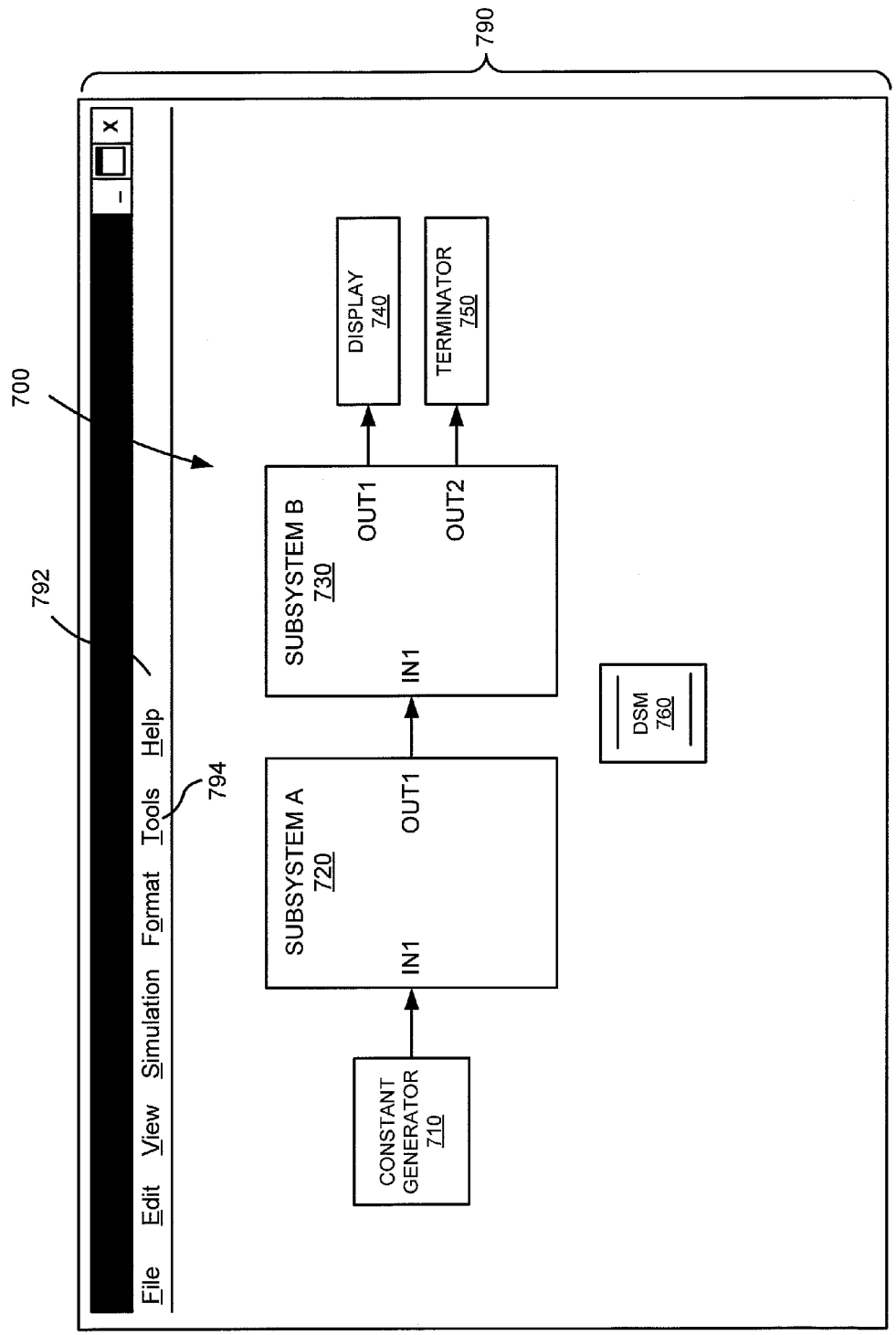
FIGS. 7A-B illustrate an example of a model, containing an atomic subsystem, that may be analyzed to identify one or more patterns associated with accessing a data store associated with the model.

The following examples may be helpful in understanding the above. FIG. 7A illustrates an example block diagram of a model 700 containing a data store memory block 760 that is accessed by a writer block 720 and a reader block 730. Referring to FIG. 7A, model 700 may be constructed from a number of blocks 710-760 where a block 710-760 may represent executable code that may be configured to implement, for example, functionality associated with a system represented by model 700. The blocks 710-760 may be graphically placed in the model 700 using an ME, such as ME 200. The blocks 710-760 may be placed, for example, from block libraries, where a block in a block library may be a block designed by a manufacturer of the ME, a third party, or the user of the ME.

A user may interact with model 700 through a graphical window 790 that may be provided by the ME. Graphical window 790 may provide an interface through which commands relating to model 700 may be entered. For example, graphical window 790 may include a menu bar 792 that may allow the user to select various menus. The menus may contain menu selections that when selected perform various functions (e.g., start/stop simulation, start/stop analysis, etc.). For example, menu bar 792 contains a "tools" menu 794 which may include a menu selection (not shown) that when selected may start an analysis of the model 700 to identify certain patterns with respect to accessing DSM 760, as described above. It should be noted that other techniques may be used to perform functions related to model 700. For example, a command line interface may be provided, e.g., in a separate window (not shown), that enables commands relating to the model 700 to be entered. The commands when entered may perform various functions associated with the model 700, as described above.

Model 700 includes a constant generator block 710, a first subsystem (subsystem A) block 720, a second subsystem (subsystem B) block 730, a display block 740, a terminator block 750 and DSM block 760. The constant generator block 710 is configured to generate a constant value that is output by the constant generator block 710 and input into input port (inport) IN1 of subsystem A 720. A first output port (outport) OUT1 of subsystem A 720 connects to an inport IN1 of subsystem B 730. A first outport OUT1 of subsystem B 730 connects to the display block 740 and a second outport OUT2 of subsystem B 730 connects to the terminator block 750. DSM block 760 is configured to provide a data store memory for model 700.

Figure 7B:
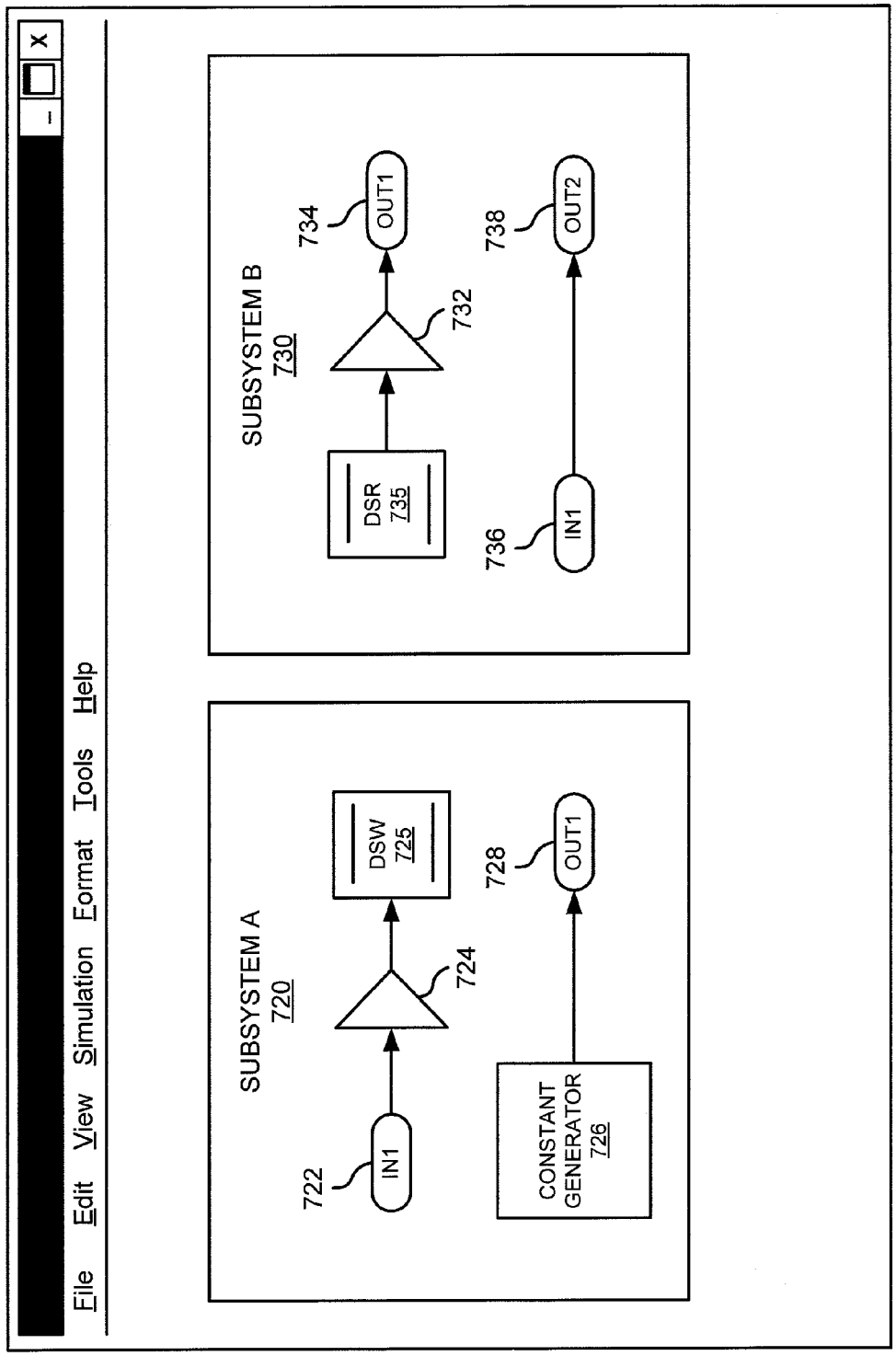

FIG. 7B illustrates subsystem A 720 and subsystem B 730 in more detail. Referring to FIG. 7B, subsystem A 720 includes an inport block IN1 722, a gain block 724, a DSW block 725, a constant generator block 726, and an outport block OUT1 728. Inport block IN1 722 is a virtual block that is used to represent the IN1 input port for subsystem A 720. Gain block 724 amplifies a value (signal) that is input into subsystem A 720 via inport 722, depending on a gain setting for the block 724. The gain block 724 outputs the amplified value to the DSW block 725 which writes the value into DSM 760.

Subsystem B 730 includes a DSR block 735, a gain block 732, an outport block OUT1 734, an inport block 736, and another outport block OUT2 738. The DSR block 735 reads the value from the data store memory 760 and inputs the value into gain block 732. Gain block 732 amplifies the value depending on a gain setting for the block 732 and outputs the value from subsystem B 730 via subsystem B's OUT1 outport. Outport block OUT1 734 is a virtual block that represents outport OUT1 for subsystem B 730.

Referring now to FIGS. 7A-B, operationally, constant generator 710 generates a value that is input into subsystem A 720 at inport IN1 722. The value is amplified by gain block 724 and written into DSM 760 by DSW block 725. Constant generator 726 generates a value that is output from subsystem A 720 via outport OUT1 728.

The value is input into subsystem B 730 at inport 736 and output from subsystem B 730 at outport OUT2 738. In addition, DSR block 735 reads the value written into DSM 760 and inputs the value into gain block 732. Gain block 732 amplifies the value and outputs the amplified value from subsystem B at outport OUT1 734. Display block 740 displays the value that is output from outport OUT1 734 and terminator block 750 provides a termination for the value that is output from outport OUT2 738.

Figure 8:
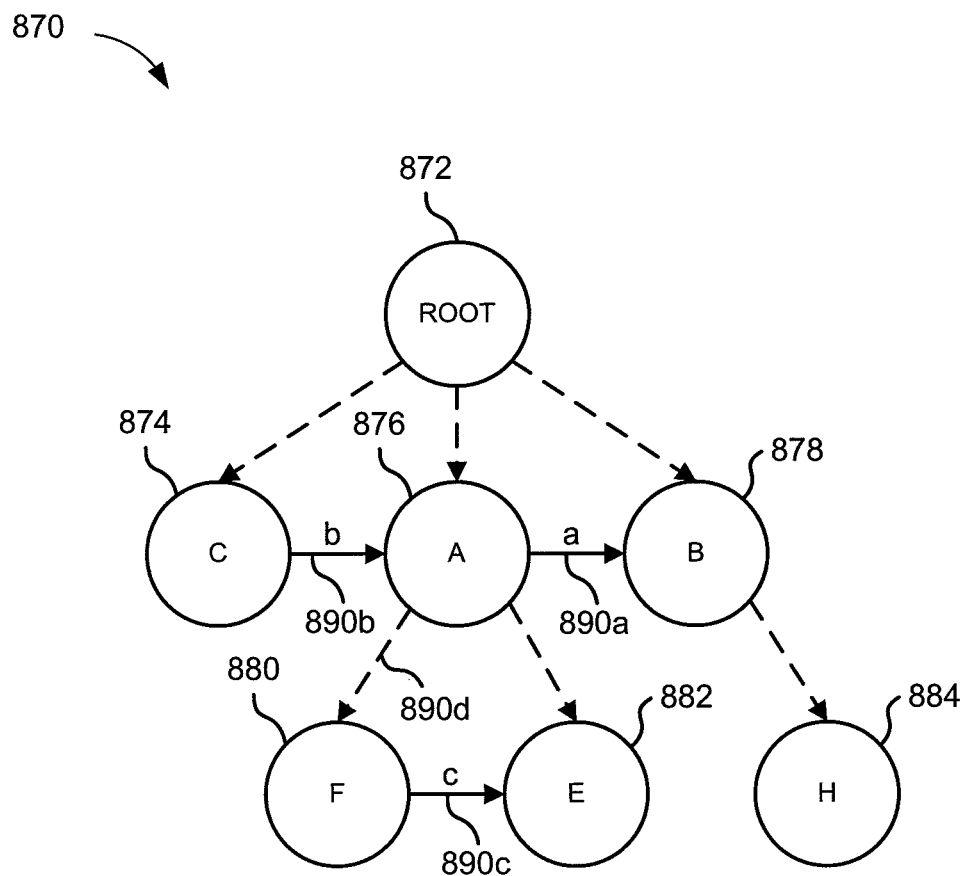
FIG. 8 illustrates an example of an execution control graph that may be generated from an execution of the model illustrated in FIGS. 7A-B.

FIG. 8 illustrates an example of an execution control graph 870 that may be generated from an execution of model 700. Referring to FIG. 8, graph 870 comprises a series of nodes 872-884 connected via a series of edges. The solid edges 890*a-c* correspond to dependencies between blocks in model 700. For example, solid edge 890*a* indicates that execution of block 730 depends on the execution of block 720. The dashed edges correspond to parent-child relationships between blocks. For example, dashed edge 890*d* indicates that block 724 is a child of block 720 which is a parent of block 724.

Node 872 is a root node for the graph 870. Referring to FIGS. 7A-B and 8, nodes 874, 876, 878, 880, 882, and 884 in graph 870 correspond to blocks 710, 720, 730, 724, 725, and 735, respectively, in model 700. Edges 890*a*, 890*b*, and 890*c*, in graph 870 correspond to execution flow relationships (that may be determined from input/output dependencies by compiling the model) between blocks 720 and 730, 710 and 720, and 724 and 725, respectively. For example, edge 890*b* indicates that execution of block 720, which corresponds to node 876, depends on the execution of block 710, which corresponds to node 874.

Of interest may be to identify whether DSR block 735 can execute before DSW block 725. In other words, whether the data store 760 may be read before it is written. A Boolean expression that may be derived from execution control graph 870 that includes this condition is as follows:

$(\neg H_S \vee B_S) \wedge (\neg B_E \vee H_E) \wedge (\neg H_E \vee H_S \vee B_E) \wedge (\neg H_E \vee H_S \vee \neg B_S) \wedge (\neg B_S \vee \text{Root}_S) \wedge (\neg \text{Root}_E \vee B_E) \wedge (\neg B_E \vee B_S \vee \text{Root}_E) \wedge (\neg B_E \vee B_S \vee \text{Root}_S) \wedge (\neg B_S \vee a_R) \wedge \text{Root}_S \wedge (\neg B_S \vee \neg A_S \vee A_E \vee B_E) \wedge (\neg B_S \vee \neg C_S \vee B_E \vee C_E) \wedge (\neg A_S \vee \neg C_S \vee A_E \vee C_E) \wedge (\neg A_S \vee \text{Root}_S) \wedge (\neg \text{Root}_E \vee A_E) \wedge (\neg A_E \vee A_S \vee \text{Root}_E) \wedge (\neg A_E \vee A_S \vee \neg \text{Root}_S) \wedge (\neg A_S \vee b_R) \wedge (\neg A_E \vee a_R) \wedge (\neg a_R \vee A_E) \wedge (\neg E_S \vee \neg F_S \vee E_E \vee F_E) \wedge (\neg E_S \vee \text{Root}_S) \wedge (\neg \text{Root}_E \vee C_E) \wedge (\neg C_E \vee \text{Root}_E \vee C_S) \wedge (\neg \text{Root}_S \vee \neg C_E \vee C_S) \wedge (\neg C_E \vee b_R) \wedge (\neg b_R \vee C_E) \wedge (\neg E_S \vee A_S) \wedge (\neg A_E \vee E_E) \wedge (\neg E_E \vee A_E \vee E_S) \wedge (\neg A_S \vee \neg E_E \vee E_S) \wedge (\neg E_S \vee c_R) \wedge (\neg F_S \vee A_S) \wedge (\neg A_E \vee F_E) \wedge (\neg F_E \vee A_E \vee F_S) \wedge (\neg A_S \vee \neg F_E \vee F_S) \wedge (\neg F_E \vee c_R) \wedge (\neg c_R \vee F_E) \wedge H_E \wedge H_S \wedge \neg E_S$ Note that the above expression may be unsatisfiable for model 700 which implies that the DSR block 735 cannot execute prior to the DSW block 725 given the execution flow relationships. Referring to FIGS. 7A-B, this also can be seen in model 700. Since subsystem B 730 is dependent on subsystem A 720, any blocks in subsystem B 730, including DSR block 735, do not execute until the blocks in subsystem A 720 have executed, including DSW block 725.

Figure 9A:
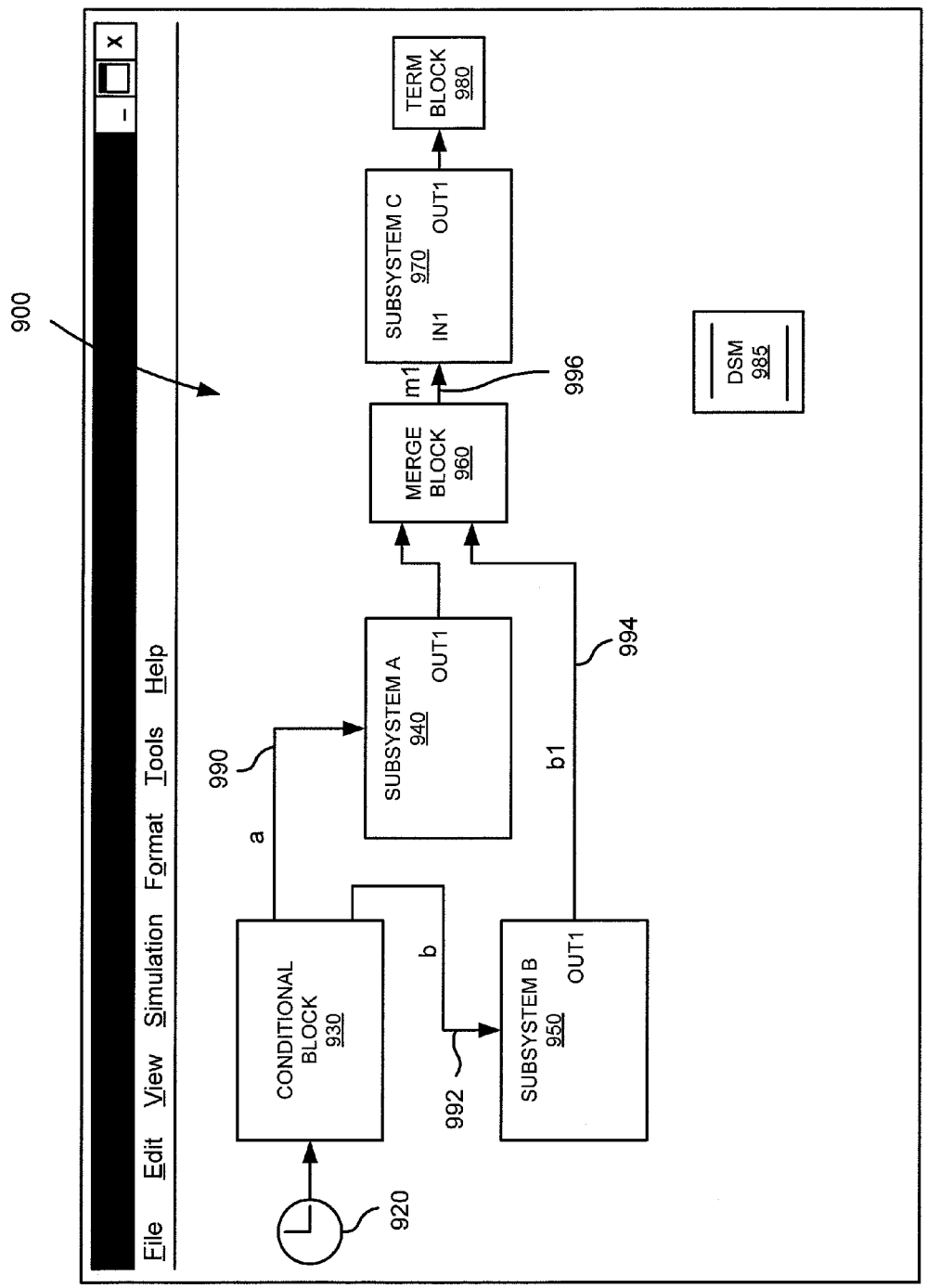
FIGS. 9A-D illustrate an example of a model, containing an action subsystem, that may be analyzed to identify one or more patterns associated with accessing a data store associated with the model.
Figure 9B:
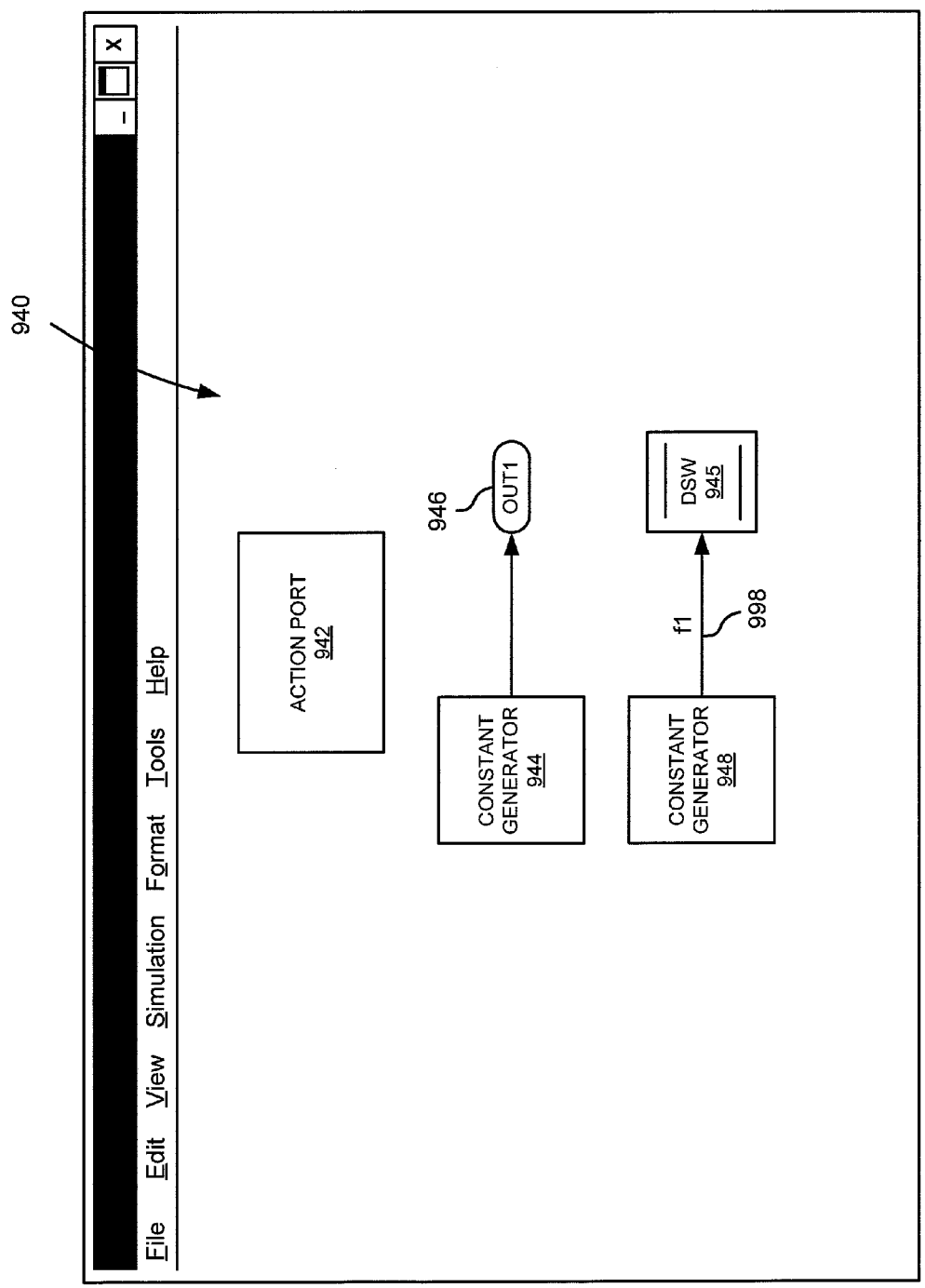
Figure 9C:
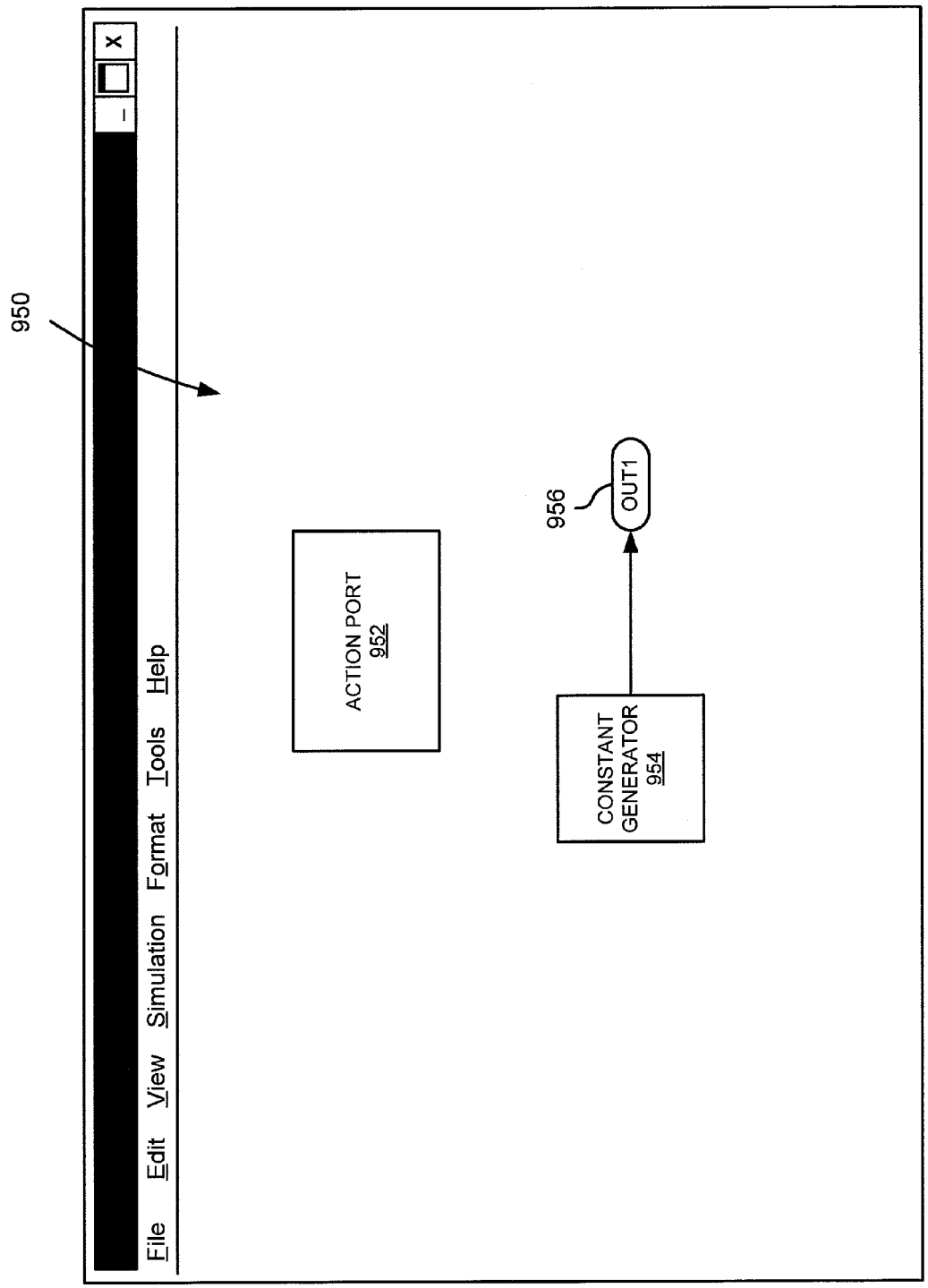
Figure 9D:
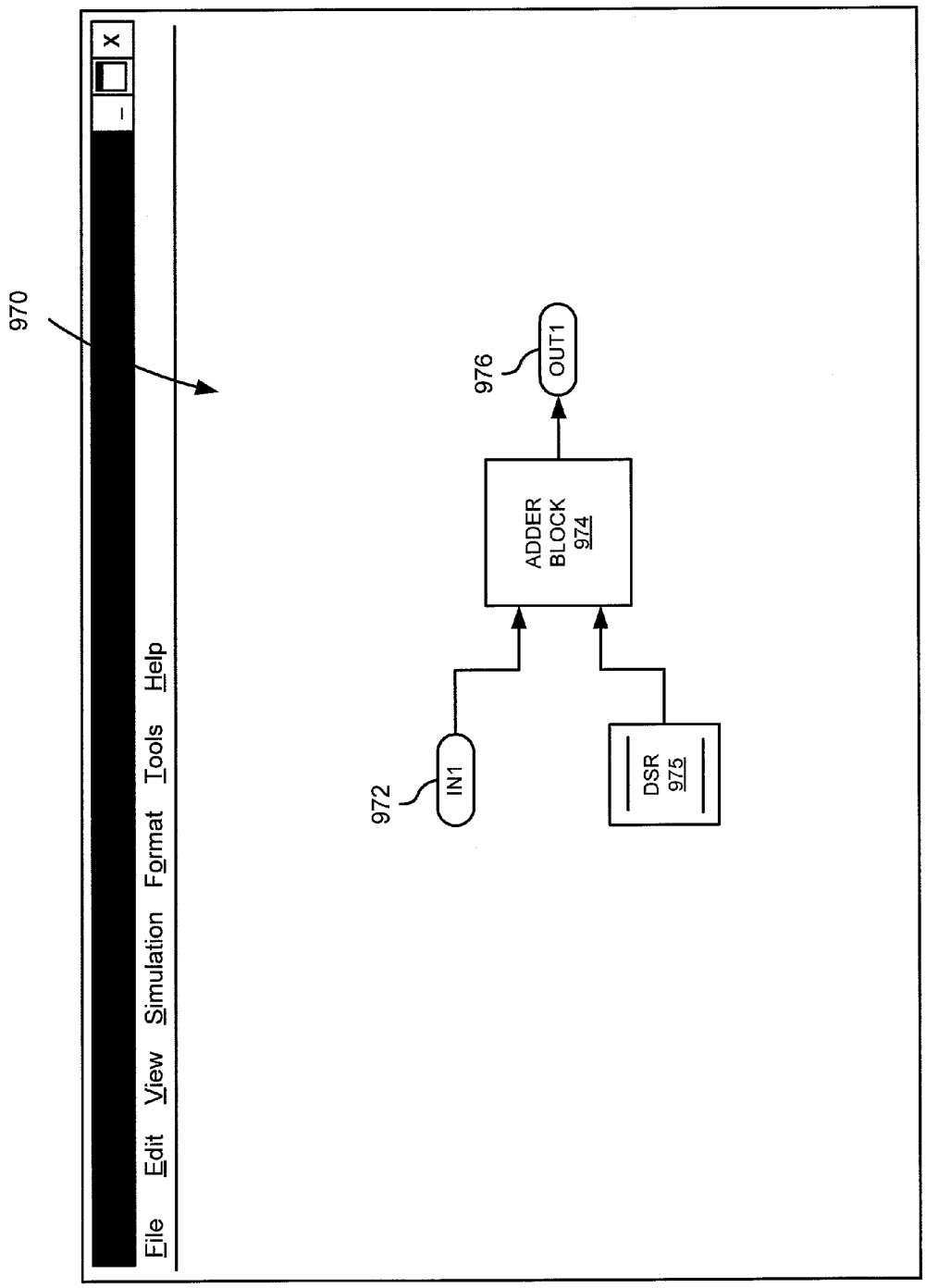

FIGS. 9A-D illustrate a model 900 that includes if-action subsystems 940 and 950. Referring to FIG. 9A, the model 900 includes a clock 920, a conditional block 930, a first subsystem (subsystem A) 940, a second subsystem (subsystem B) 950, a merge block 960, a third subsystem (subsystem C) 970, a termination block 980, and a DSM block 985. The DSM block 985 provides a data store for the model 900. FIG. 9B illustrates subsystem A 940 in more detail. Subsystem A 940 includes an action port block 942, a first constant generator block 944, an outport block 946, a second constant generator block 948, and a DSW block 945. FIG. 9C illustrates subsystem B 950 in more detail. Subsystem B 950 includes an action port block 952, a constant generator block 954, and an outport block 956. FIG. 9D illustrates subsystem C 970 in more detail. Subsystem C 970 includes an inport block 972, a DSR block 975, an adder block 974, and an outport block 976.

Referring to FIGS. 9A-D, operationally, the clock 920 provides a clock signal to the conditional block 930 which outputs signal a 990 or signal b 992 based on a value associated with the signal provided by clock 920. For example, if the value of the clock signal is a logic high (e.g., a "1"), signal a 990 may be output as an activation signal (e.g., a logic high) and signal b may be output as a deactivation signal (e.g., a logic low). If the clock signal is a logic low (e.g., a "0"), signal a 990 may be output as a deactivation signal and signal b 992 may be output as an activation signal.

Signal a 990 is fed to subsystem A 940 via its action port 942 (FIG. 9B). An activation signal at action port 942 causes subsystem A 940 to be enabled. While subsystem A 940 is enabled, constant generator 944 generates a value that is output via outport 946. Moreover, constant generator 948 generates a value that is stored in (written to) the DSM 985 by DSW block 945.

Likewise, signal b 992 is fed to subsystem B 950 via its action port 952 (FIG. 9C). An activation signal at action port 952 causes subsystem B 950 to be enabled. While subsystem B 950 is enabled, constant generator 954 generates a value that is output via outport 956. Note that DSM 985 is not written when subsystem B 950 is enabled.

At a given time, either subsystem A 940 is enabled or subsystem B 950 is enabled by conditional block 930. Thus, either subsystem A 940 or subsystem B 950 will output a signal. Merge block 960 merges the output of either subsystem A 940 or subsystem B 950 into a signal m1 996, which is fed to subsystem C 970. Subsystem C 970 receives signal m1 996 at inport IN1 972. Likewise, DSR block 975 reads DSM 985. Adder block 974 adds the value of signal m1 996 at inport IN1 972 to the value read by DSR block 975 to generate a result. The result is output from subsystem C 970 via outport OUT1 976. The result is input into terminator block 980 which provides a termination point for the result.

Figure 10:
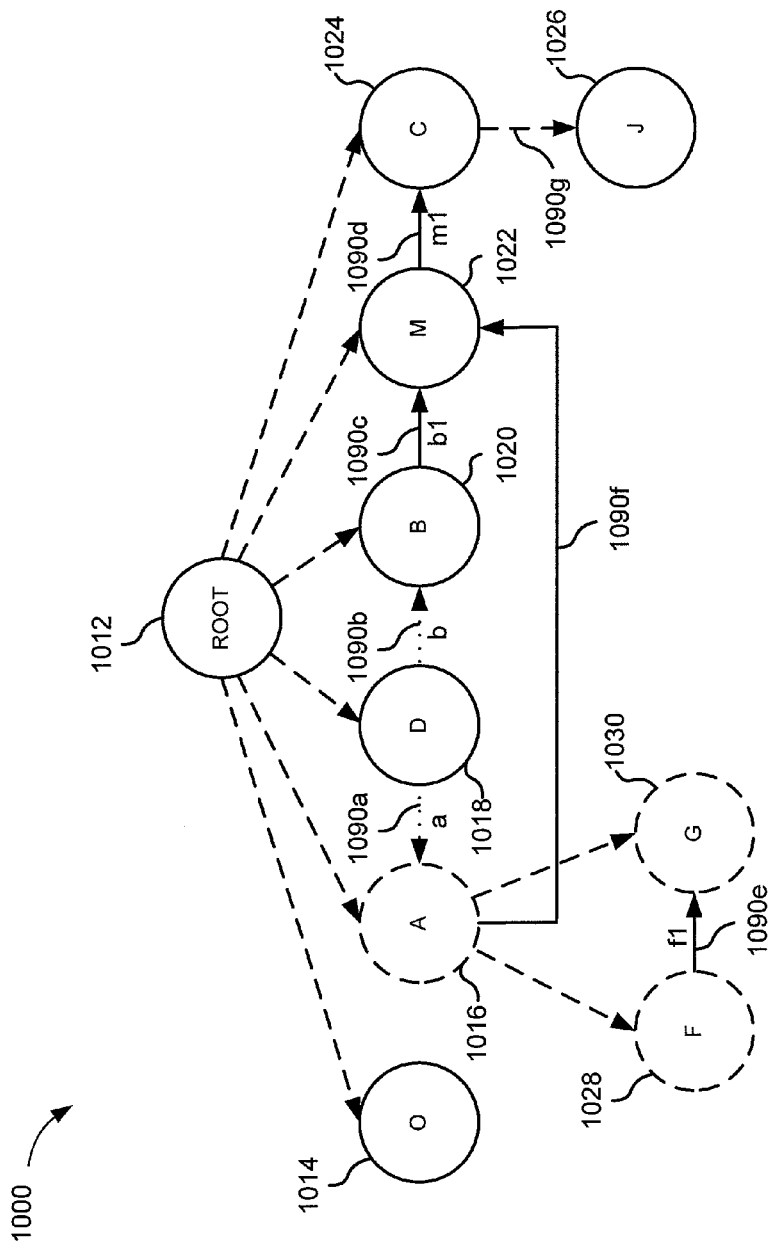
FIG. 10 illustrates an example of an execution control graph that may be generated to represent an execution of the model illustrated in FIGS. 9A-D.

FIG. 10 illustrates an execution control graph 1000 that may be generated for model 900. Note that execution control graph 1000 represents an execution of model 900. Referring to FIG. 10, graph 1000 comprises a group of nodes connected by various edges. Node 1012 is a root node for the graph 1000. Nodes 1014, 1016, 1018, 1020, 1022, 1024, 1026, 1028, and 1030 correspond to blocks 920, 940, 930, 950, 960, 970, 975, 948, and 945, respectively. Nodes 1016, 1028, and 1030 are represented as dashed edged circles to indicate that the blocks corresponding to the nodes are not active (i.e., not executed) in the execution of model 900 represented by the graph 1000. Nodes 1014, 1018, 1020, 1022, 1024, and 1026 are represented as solid edged circles to indicate that the blocks corresponding to the nodes that are active (i.e., executed) in the execution.

Dotted edges, such as edges 1090*a* and 1090*b*, correspond to control signals between conditional block 930 and subsystems 940*a* and 940*b*. For example, edge 1090*a* represents control signal a 990 and edge 1090*b* represents control signal b 992. Dashed edges, such as edge 1090*g*, correspond to parent-child relationships between blocks. For example, edge 1090*g* corresponds to a parent-child relationship between block 970 and block 975. Solid edges, such as edges 1090*c-f*, correspond to dependencies between blocks. Thus, for example, edge 1090*d* indicates that the execution of block 970 depends on the execution of block 960.

Execution control graph 1000 may be analyzed to determine whether model 900 exhibits certain patterns (e.g., desirable, undesirable, anomalous, etc.) with respect to access (e.g., read and/or write) to the DSM 985. The analysis may include generating an expression, such as a Boolean expression, that may be derived from the execution control graph, as described above. In addition the analysis may include solving the expression using, e.g., a SAT solver, to determine if the expression indicates that model 900 exhibits certain patterns with respect to accessing DSM 985. Here, the expression may include a condition to be tested for that represents a certain pattern (e.g., whether DSM 985 is read before it is written). The expression may be evaluated by the solver to determine if the condition is met. If the condition is met, then that the model 900 may exhibit the pattern, an appropriate result may be generated, and output, as described above.

Graph 1000 indicates that DSM 985 may be read by DSR 975 before it is written by DSW 945. Therefore, model 900 may be considered to include this pattern with respect to access to the DSM 985. Note that this pattern may be indicated, e.g., to a user, by displaying various nodes in the graph 1000 or blocks in the model 900 that may be associated with the read and/or write pattern differently than other nodes in the graph 1000 or blocks in the model 900, as described above. For example, nodes 1020, 1022, 1024, and 1026 may be highlighted or colored in a display of graph 1012 that is presented to a user to indicate that these nodes are involved in the pattern. Likewise, for example, blocks that correspond to these nodes may be highlighted or colored in a graphical block diagram display of the model 900.

Figure 11A:
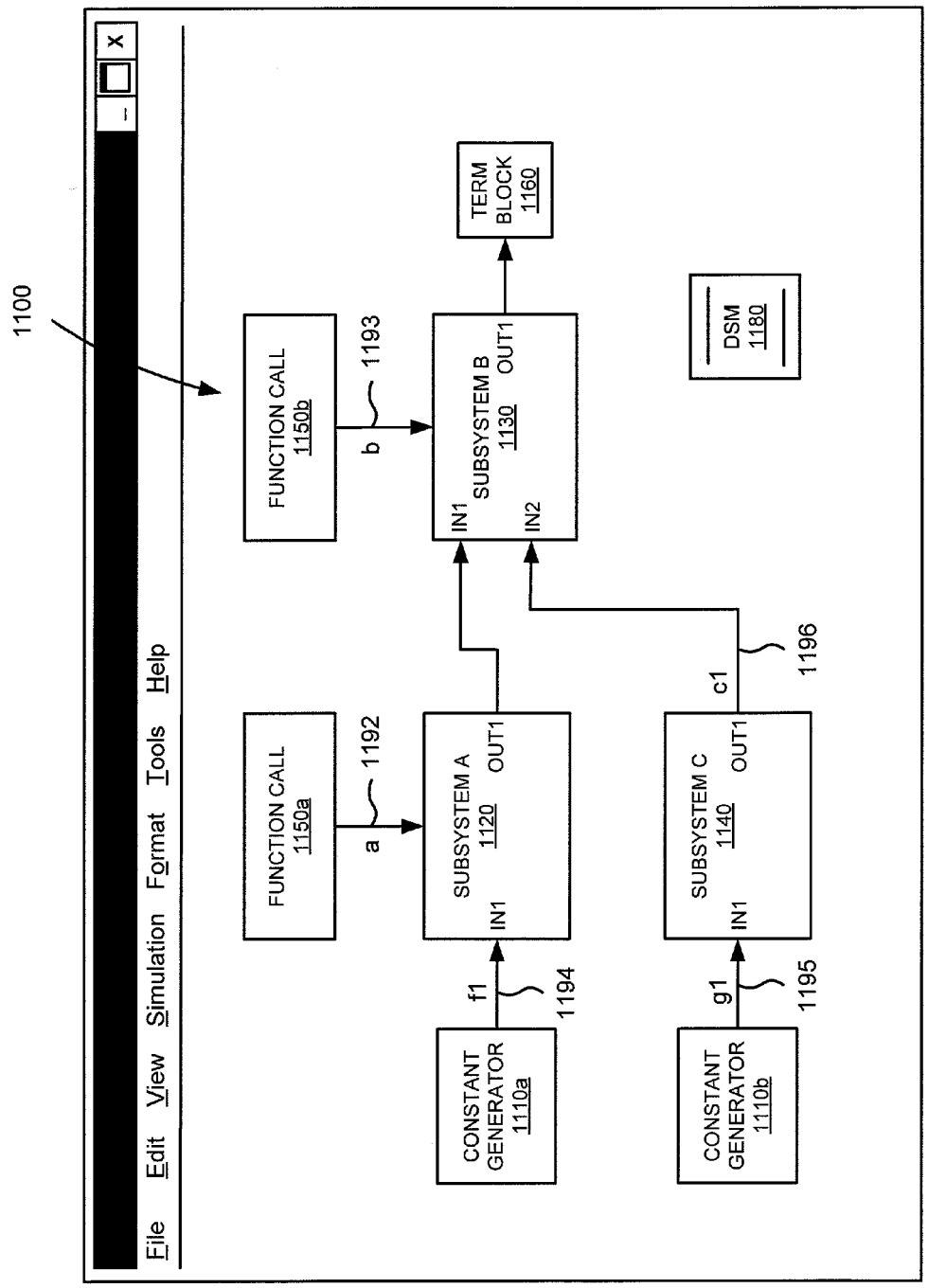
FIGS. 11A-D illustrates an example of a model, containing a function call subsystem, that may be analyzed to identify one or more patterns associated with accessing a data store associated with the model.

FIGS. 11A-D illustrate a model 1100 that includes function-call subsystems 1120 and 1140. Referring to FIG. 11A, model 1100 includes a first constant generator block 1110a, a second constant generator block 1110b, a subsystem A 1120, a subsystem B 1130, a subsystem C 1140, a first function call block 1150a, a second function call block 1150b, a terminator block 1160, and a DSM 1180.

Figure 11B:
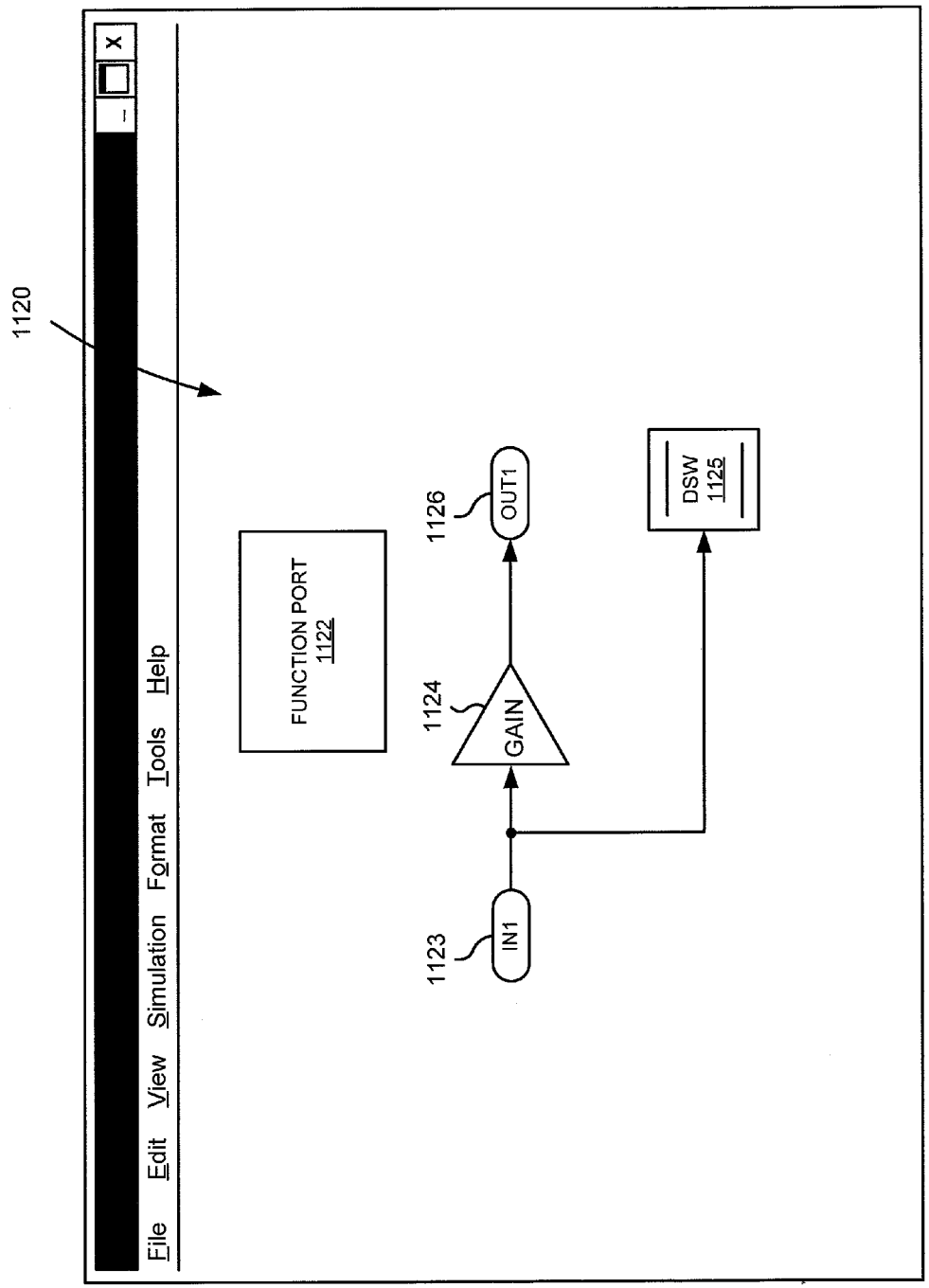
Figure 11C:
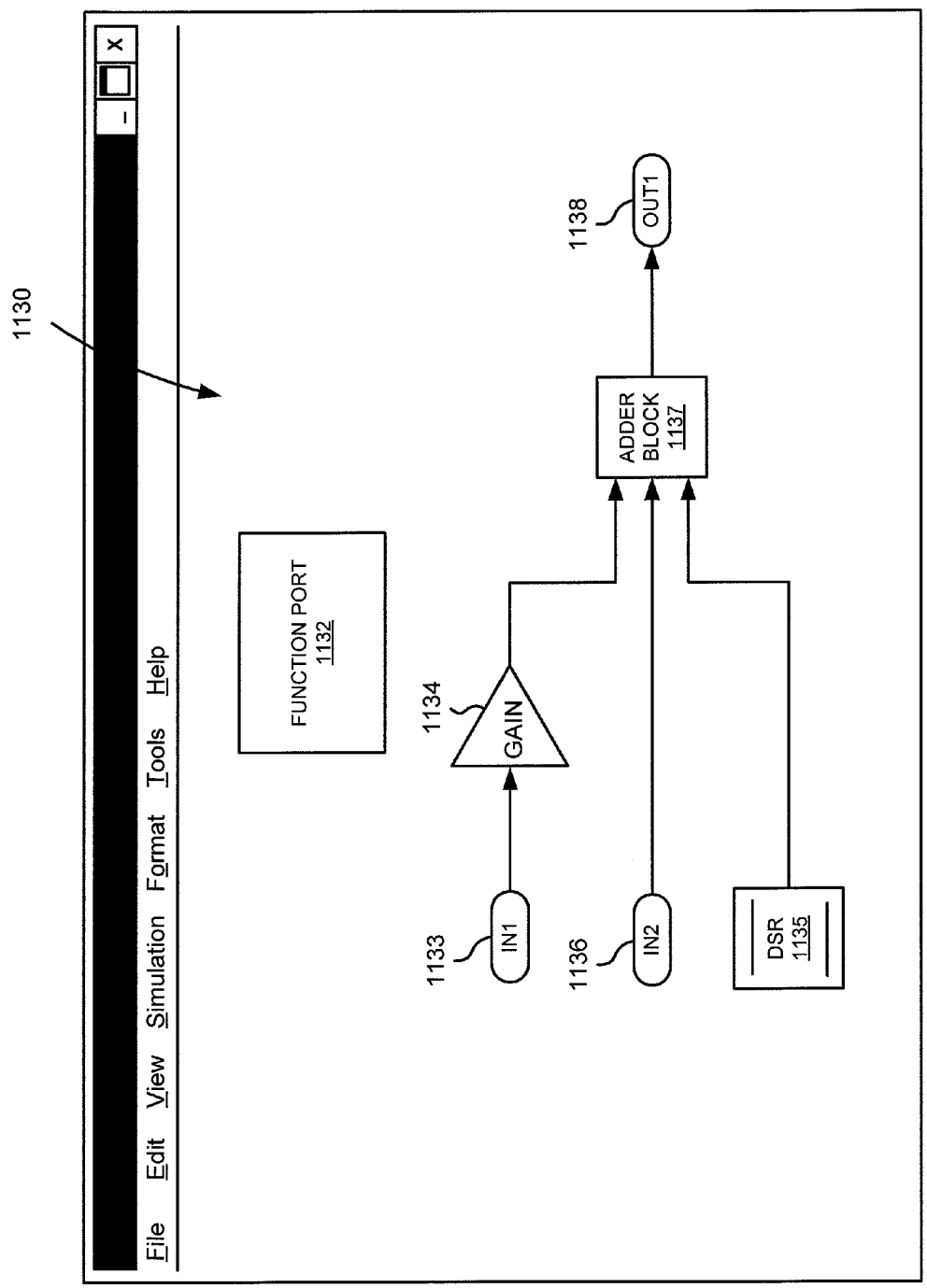
Figure 11D:
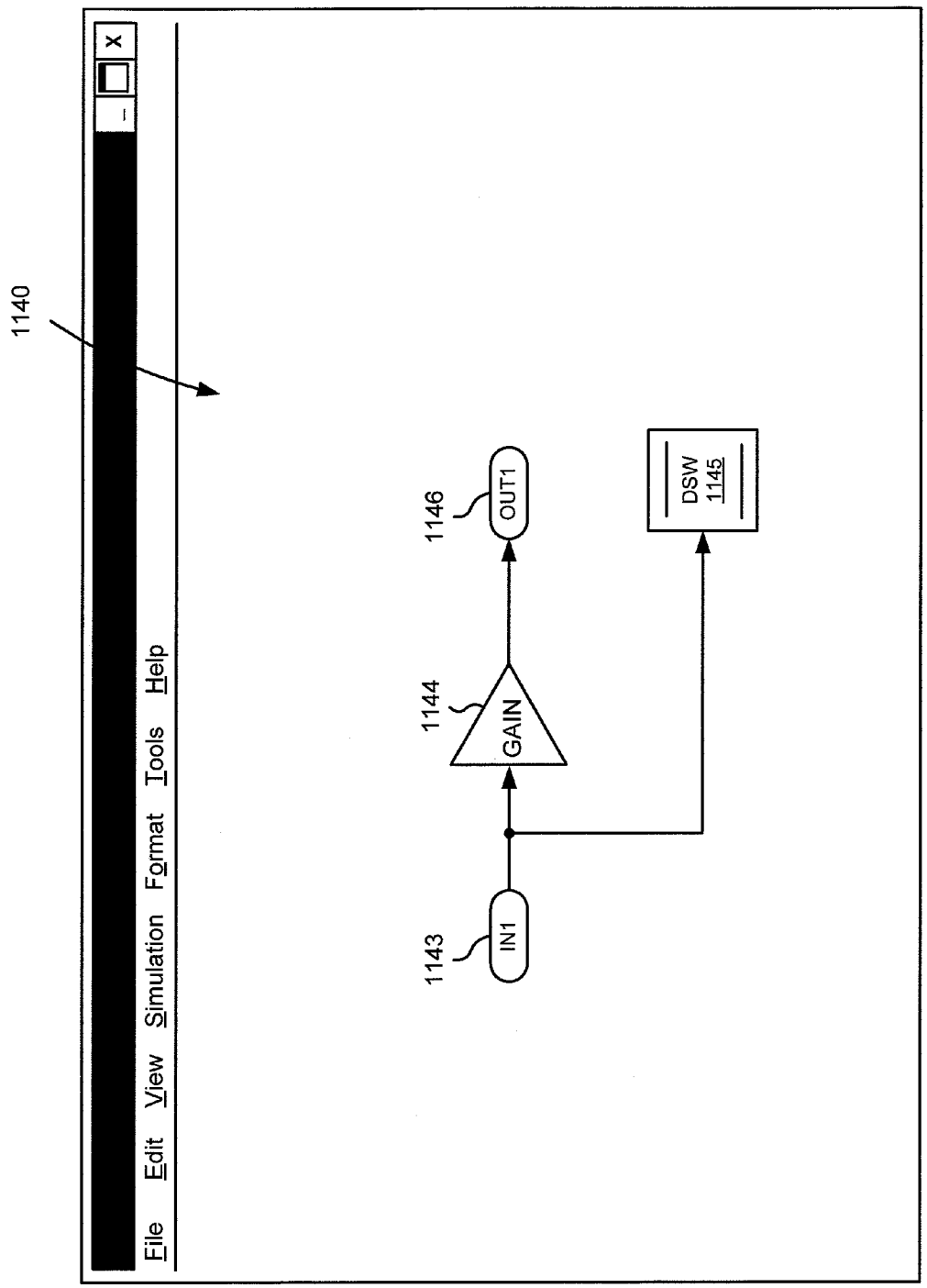

FIG. 11B illustrates subsystem A 1120 in more detail. Referring to FIG. 11B, subsystem A 1120 includes a function port 1122, an inport IN1 1123, a gain block 1124, and outport 1126 and a DSW block 1125. FIG. 11C illustrates subsystem B 1130 in more detail. Referring to FIG. 11C, subsystem B 1130 includes a function port 1132, a first inport IN1 1133, a second inport IN2 1136, a DSR block 1135, a gain block 1134, an adder block 1137, and an outport OUT1 1138. FIG. 11D illustrates subsystem C 1140 in more detail. Referring to FIG. 11D, subsystem C 1140 includes an inport IN1 1143, a gain block 1144, an outport OUT1 1146, and a DSW block 1145.

Operationally, function call block 1150a generates a function call that is input into subsystem A 1120 via function port 1122 and enables execution of subsystem A 1120. Constant generator 1110a inputs a value into subsystem A 1120 via inport IN1 1123. The value is amplified by gain block 1124 and output from subsystem A 1120 at outport OUT1 1126. In addition, the value at inport IN1 1123 is written to DSM 1180 by DSW block 1125.

Likewise, constant generator 1110b generates a value that is input into subsystem C 1140 at inport IN1 1143. The value is amplified by gain block 1144 and output from subsystem C 1140 via outport 1146. In addition, the value is written to DSM 1180 by DSW block 1145.

A second function call is generated by function call block 1150b which is input into subsystem B 1130 at function port 1132 and enables subsystem B 1130 to execute. The value that is output from outport 1126 is input into subsystem B 1130 at inport IN1 1133 and the value that is output from outport 1146 is input into subsystem B 1130 at inport IN2 1136. The value that is input via inport IN1 1133 is amplified by gain block 1134 whose output is fed to a first input of adder block 1137. Likewise, the value fed into subsystem B via inport IN2 1136 is fed to a second input of adder block 1137. In addition, the DSR block 1135 reads the DSM 1180 and outputs a value that is fed to a third input of adder block 1137. Adder block 1137 adds the values at its three inputs and produces a result that is output from subsystem B via outport OUT1 1138 to terminator block 1160.

Figure 12:
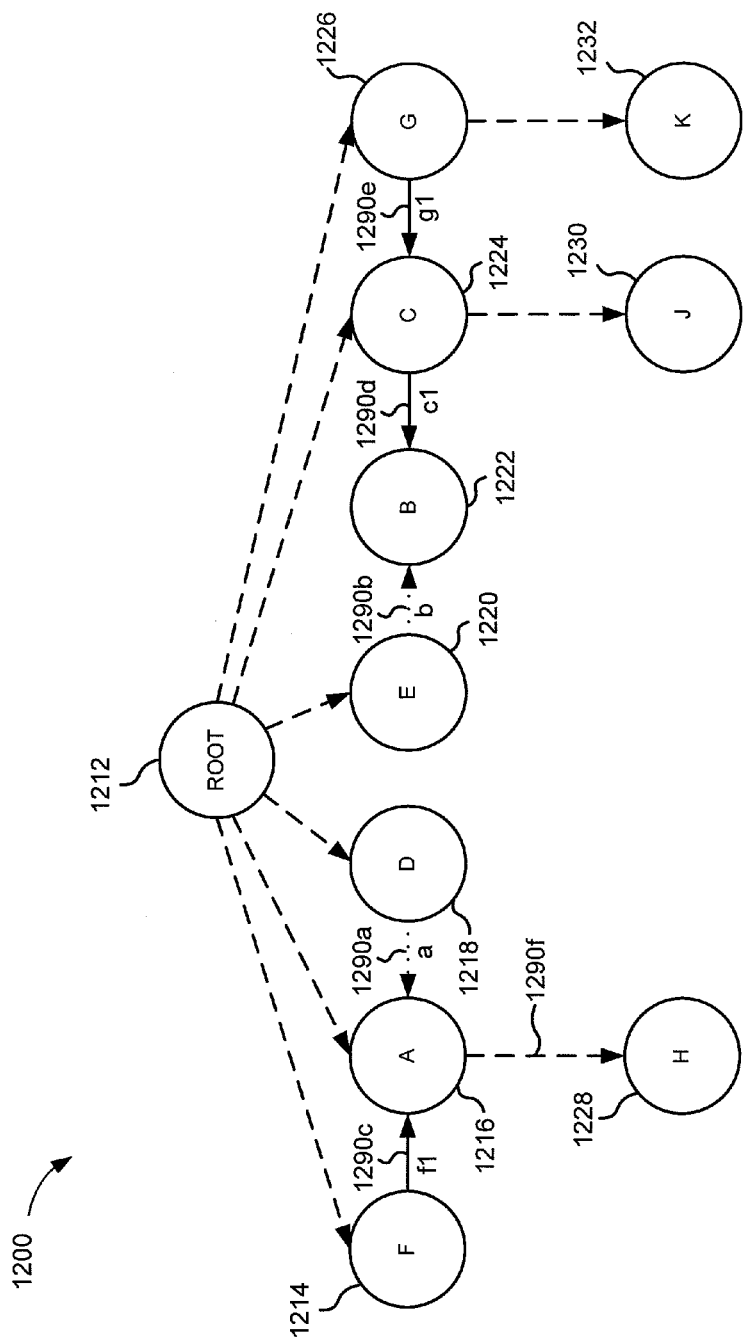
FIG. 12 illustrates an example of an execution control graph that may be generated to represent an execution of the model illustrated in FIGS. 11A-D.

FIG. 12 is an execution control graph 1200 that may be used to represent an execution of model 1100. Referring to FIG. 12, the graph 1200 includes a series of nodes and edges. Node 1212 is a root node for the graph 1200. Nodes 1214, 1216, 1218, 1220, 1222, 1224, 1226, 1228, 1230, and 1232 correspond to blocks 1110a, 1120, 1150a, 1150b, 1130, 1140, 1110b, 1125, 1135, and 1145 in model 1100. Dashed edges are used to indicate correspondent parent-child relationships between blocks. For example, dashed edge 1290f corresponds to a parent-child relationship between block 1120 and block 1125. Dotted edges, such as edges 1290a and 1290b, correspond to control signals between blocks. For example, edge 1290a corresponds to control signal "a" which is between blocks 1150a and 1120. Likewise, edge 1290b corresponds to control signal "b" which is between blocks 1150b and 1130. Solid edges, such as edges 1290c-e, correspond to dependencies (e.g., execution dependencies) between blocks. For example, edge 1290e corresponds to an execution dependency between block 1110b and block 1140. In other words, edge 1290e indicates that block 1140 is dependent on the execution of block 1110b.

An analysis of graph 1200 shows that subsystem C 1140 executes within the execution of model 1100 represented by the graph 1200 and DSM 1180 is written by DSW 1145 before DSR block 1135 executes. If subsystem A 1120 is activated by function call 1150a, DSW 1125 also writes to DSM 1180 before DSR block 1135 executes. Thus, if subsystem A 1120 is activated, DSM 1180 is written twice prior to being read by DSR block 1135. This may lead to an undesirable and/or anomalous read/write pattern (i.e., the DSM 1180 is written twice before it is read). As noted above, this pattern may be illustrated, for example, on the graph 1200 and/or model 1100 to indicate that the pattern exists in the model 1100.

Figure 13:
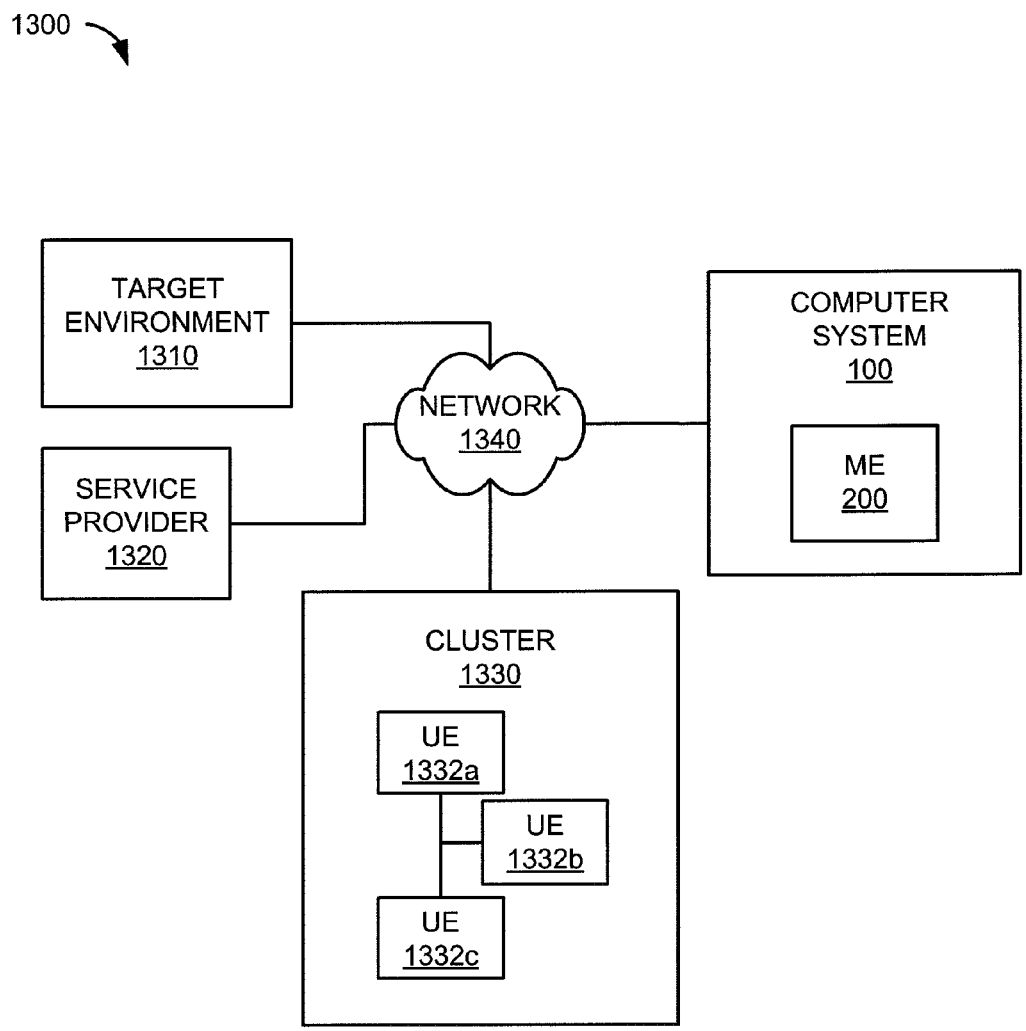
FIG. 13 illustrates an example of a distributed environment that may be configured to implement one or more embodiments of the invention.

One or more embodiments of the invention may be implemented in a distributed environment. FIG. 13 illustrates an example of a distributed environment 1300 that may be configured to implement one or more embodiments of the invention. Referring to FIG. 13, environment 1300 may contain various entities including computer system 100, target environment 1310, service provider 1320, cluster 1330, and network 1340. Note that the distributed environment illustrated in FIG. 13 is just one example of an environment that may be used with embodiments of the invention. Other distributed environments that may be used with embodiments of the invention may contain more entities, fewer entities, entities in arrangements that differ from the arrangement illustrated in FIG. 13, and so on.

Details of computer system 100 were described above with respect to FIG. 1. In distributed environment 1300, computer system 100 may be configured to, among other things, exchange information (e.g., data) with other entities (e.g., target environment 1310, service provider 1320, and cluster 1330) in network 1340. Computer system 100 may interface with the network 1340 via communication interface 180.

The network 1340 may include a communication network capable of exchanging information between the entities in the network 1340. The network 1340 may include digital and/or analog aspects. The information may include machine-readable information having a format that may be adapted for use, for example, in the network 1340 and/or with one or more entities in the network 1340. For example, the information may be encapsulated in one or more packets that may be used to transfer the information through the network 1340.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 1340 may comprise various network devices, such as gateways, routers, switches, firewalls, servers, address translators, etc. Portions of the network 1340 may be wired (e.g., using wired conductors, optical fibers, etc.) and/or wireless (e.g., using free-space optical (FSO), radio frequency (RF), acoustic transmission paths, etc.). Portions of network 1340 may include a substantially open public network, such as the Internet. Portions of the network 1340 may include a more restricted network, such as a private corporate network. It should be noted that implementations of networks and/or devices operating on networks described herein are not limited with regards to information carried by the networks, protocols used in the networks, the architecture/configuration of the networks, etc.

The service provider 1320 may include logic (e.g., software) that makes a service available to another entity in the distributed environment 1300. The service provider 1320 may also include a server operated by, for example, an individual, a corporation, an educational institution, a government agency, and so on, that provides one or more services to a destination, such as computer system 100. The services may include software containing computer-executable instructions that implement one or more embodiments of the invention or portions thereof, and may be executed, in whole or in part, by (1) a destination, (2) the service provider 1320 on behalf of the destination, or (3) some combination thereof.

For example, in an embodiment, service provider 1320 may provide one or more subscription-based services that may be available to various customers. The services may be accessed by a customer via network 1340. The customer may access the services using a computer system, such as computer system 100. The services may include services that implement one or more embodiments of the invention or portions thereof. The service provider 1320 may limit access to certain services based on, e.g., a customer service agreement between the customer and the service provider 1320.

The service agreement may allow the customer to access the services that may allow the customer to build, execute, and/or analyze a model, such as model 210, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1330 may include a number of units of execution (UEs) 1332 that may perform processing of one or more embodiments of the invention or portions thereof on behalf of computer system 100 and/or another entity, such as service provider 1320. The UEs 1332 may reside on a single device or chip or on multiple devices or chips. For example, the UEs 1332 may be implemented in a single ASIC or in multiple ASICs. Likewise, the UEs 1332 may be implemented in a single computer system or multiple computer systems. Other examples of UEs 1332 may include FPGAs, CPLDs, ASIPs, processors, multiprocessor systems-on-chip (MPSoCs), graphic processing units, microprocessors, etc.

The UEs 1332 may be configured to perform operations on behalf of another entity. For example, in an embodiment, the UEs 1332 are configured to execute portions of code associated with the ME 200. Here, the ME 200 may dispatch certain activities pertaining to one or more embodiments of the invention to the UEs 1332 for execution. The service provider 1320 may configure cluster 1330 to provide, for example, the above-described services to computer system 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above (e.g., with respect to FIGS. 4, 5 and 6), the order of the acts may be modified in other implementations. Further, non-dependent acts may be performed in parallel. Also, for example, an execution control graph may be generated from an intermediate representation (IR) of a model that is being analyzed. Here, the IR may contain one or more nodes that represent blocks in the model. In an embodiment, an IR is generated from a stateflow chart. Sequential logic of the stateflow chart can be represented in the IR and an execution control graph is generated based on, for example, state activation of the sequential logic represented in the IR.

Also, the term "user", as used herein, is intended to be broadly interpreted to include, for example, a computer system (e.g., a workstation) or a user of a computer system, unless otherwise stated.

It will be apparent that embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more computer-readable storage media and may include computer-executable instructions for execution by processing logic, such as processing logic 120. The computer-executable instructions may be configured to implement one or more embodiments of the invention. The computer-readable storage media may be volatile or non-volatile and may include, for example, flash memories, removable disks, non-removable disks, and so on.

In addition, it should be noted that various electromagnetic signals, such as wireless signals, electrical signals carried over a wire, optical signals carried over optical fiber, etc., may be encoded to carry data and/or computer-executable instructions, configured to implement one or more embodiments of the invention, on, for example, a communication network, such as network 1340.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable storage media comprising:
   one or more instructions that, when executed by processing logic, cause the processing logic to:
   generate an execution control graph that represents an execution of a model, the execution control graph including:
   a plurality of nodes,
      each node, of the plurality of nodes, corresponding to one or more blocks of the model, and
   a plurality of edges,
      each edge, of the plurality of edges, extending between two of the plurality of nodes to indicate an execution relationship between the two of the plurality of nodes;
   analyze the plurality of edges and the plurality of nodes in the execution control graph;

determine, based on analyzing the plurality of edges and the plurality of nodes, an existence of a particular pattern associated with accessing a data store during the execution of the model, the one or more instruction that, when executed by the processing logic, cause the processing logic to determine the existence of the particular pattern further causing the processing logic to:

generate an expression based on the execution control graph and a condition, the condition representing the particular pattern;

determine, based on the generated expression, whether the condition is satisfied; and determine the existence of the particular pattern based on determining whether the condition is satisfied, where the condition is satisfied when at least one of:

the data store is accessed to read first data from the data store prior to the data store being accessed to write second data to the data store, or the data store is accessed to write the second data to the data store prior to the data store being accessed to read the first data from the data store;

generate a result based on determining the existence of the particular pattern, the generated result including information identifying the particular pattern associated with accessing the data store; and output the result.

2. The one or more non-transitory computer-readable storage media of claim 1, where the plurality of edges indicate at least one of:

dependencies between blocks in the model, or hierarchical relationships between the blocks in the model, and where the one or more instructions that, when executed by the processing logic, cause the processing logic to analyze the plurality of edges and the plurality of nodes in the execution control graph further cause the processing logic to:

analyze the plurality of edges and the plurality of nodes in the execution control graph based on the plurality of edges indicating the at least one of the dependencies or the hierarchical relationships.

3. The one or more non-transitory computer-readable storage media of claim 1, where the model is one of:

a time-based graphical block diagram model,
a state transition diagram,
a discrete event model,
an activity diagram,
a Unified Modeling Language (UML) diagram,
a sequence diagram, or
a data flow model.

4. The one or more non-transitory computer-readable storage media of claim 1, where the one or more instructions that, when executed by the processing logic, cause the processing logic to generate the expression further cause the processing logic to:

generate the expression is in a normal form.

5. The one or more non-transitory computer-readable storage media of claim 1, where the one or more instructions that, when executed by the processing logic, cause the processing logic to generate the expression further cause the processing logic to:

generate the expression in a conjunctive normal form, or
generate the expression in a disjunctive normal form.

6. The one or more non-transitory computer-readable storage media of claim 1, where the one or more instructions that, when executed by the processing logic, cause the processing logic to determine the existence of the particular pattern based on whether the condition is satisfied further cause the processing logic to:

determine the existence of the particular pattern when the condition is satisfied.

7. The one or more non-transitory computer-readable storage media of claim 1, where the one or more instructions that, when executed by the processing logic, cause the processing logic to output the result further cause the processing logic to:

output an indication that identifies the existence of the particular pattern when the condition is satisfied.

8. The one or more non-transitory computer-readable storage media of claim 1, where the one or more instructions that, when executed by the processing logic, cause the processing logic to generate the expression further cause the processing logic to:

generate a Boolean expression.

9. The one or more non-transitory computer-readable media of claim 1, where the one or more instructions that, when executed by the processing logic, cause the processing logic to output the result, further cause the processing logic to:

output the result to a device that is associated with the processing logic.

10. The one or more non-transitory computer-readable storage media of claim 1, where the one or more instructions that, when executed by the processing logic, cause the processing logic to output the result, further cause the processing logic to at least one of:

display the result on a display device associated with the processing logic, or
store the result in a storage device associated with the processing logic.

11. The one or more non-transitory computer-readable storage media of claim 1, where the one or more instructions that, when executed by the processing logic, cause the processing logic to determine the existence of the particular pattern further cause the processing logic to:

determine whether the data store is accessed a plurality of times to write third data to the data store before the data store is accessed to read fourth data from the data store.

12. A method comprising:

generating, using processing logic, an execution control graph that represents an execution of a model, the execution control graph including:

a plurality of nodes, each node, of the plurality of nodes, corresponding to one or more blocks of the model, and a plurality of edges, each edge, of the plurality of edges, extending between two of the plurality of nodes to indicate an execution relationship between the two of the plurality of nodes;

analyzing, using the processing logic, the plurality of edges and the plurality of nodes;

determine an existence of a particular pattern associated with accessing a data store during the execution of the model based on analyzing the plurality of edges and the plurality of nodes, determining the existence of the particular pattern including:

generating, using the processing logic, an expression based on the execution control graph and a condition, the condition representing the particular pattern, determining, based on the generated expression, whether the condition is satisfied; and determining the existence of the particular pattern based on determining whether the condition is satisfied, the condition being satisfied when at least one of:
the data store is accessed to read first data from the data store prior to the data store being accessed to write second data to the data store, or
the data store is accessed to write the second data to the data store prior to the data store being accessed to read the first data from the data store; and generating, using the processing logic, a result based on whether the expression is satisfied.

13. The method of claim 12, further comprising:
outputting, using the processing logic, the result to a device that is accessible to the processing logic.

14. The method of claim 12, further comprising at least one of:
displaying, using the processing logic, the result on a display device accessible to the processing logic, or
storing, using the processing logic, the result in a storage device accessible to the processing logic.

15. The method of claim 14, where outputting the result comprises displaying the result on the display device, and where displaying the result further comprises:
displaying an indication of the pattern in:
a display of the execution control graph, or
a graphical block diagram display of the model.

16. The method of claim 12, where generating the expression includes:
generating the expression in a conjunctive normal form, or
generating the expression in a disjunctive normal form.

17. The method of claim 12, where generating the expression includes:
generating a Boolean expression.

18. The method of claim 12, where the model is one of:
a time-based graphical block diagram model,
a state transition diagram,
a discrete event model,
an activity diagram,
a Unified Modeling Language (UML) diagram,
a sequence diagram, or
a data flow model.

19. The method of claim 12, where the condition further includes:
whether the data store is accessed to write the second data to the data store a plurality of times before the data store is accessed to read the second data from the data store.

20. A system comprising:
an output device; and
a processor to:
generate an execution control graph including a plurality of nodes and a plurality of edges,
the plurality of nodes corresponding to a plurality of blocks associated with a model,
the plurality of edges indicating at least one of:
dependencies between blocks in the model or
hierarchical relationships between blocks in the model, and the execution control graph representing an execution of the model,
analyze the plurality of edges in the execution control graph,
determine, based on analyzing the plurality of edges in the graph, an existence of a particular pattern associated with accessing a data store during the execution of the model,
when determining the existence of the particular pattern, the processor being to:
generate an expression based on the execution control graph and a condition,
the condition representing the particular pattern,
determine, based on the generated expression, whether the condition is satisfied, and
determine the existence of the particular pattern based on determining whether the condition is satisfied,
where the condition is satisfied when at least one of:
the data store is accessed to read first data from the data store prior to the data store being accessed to write second data to the data store, or
the data store is accessed to write the second data to the data store prior to the data store being accessed to read the first data from the data store,
generate a result based on determining the existence of the particular pattern,
the generated result including information identifying the particular pattern, and
output the result via the output device.

21. The system of claim 20, where the output device comprises:
a display device, and
where, when outputting the result, the processor is further to:
transform a graphical display of the model to indicate one or more portions of the model associated with the particular pattern.

22. A system comprising:
one or more devices including at least one processor to:
generate an execution control graph that includes a plurality of nodes and a plurality of edges,
the plurality of nodes corresponding to a plurality of blocks associated with a model,
the plurality of edges indicating at least one of dependencies between blocks in the model or hierarchical relationships between blocks in the model, and
the execution control graph representing an execution of the model;
analyze the plurality of edges in the execution control graph,
determine an existence of a particular pattern associated with accessing a data store during an execution of the model,
when determining the existence of the particular pattern, the processor being to:
generate an expression based on the execution control graph and a condition,
the condition representing the particular pattern,
determine, based on the generated expression, whether the condition is satisfied, and
determine the existence of the particular pattern based on determining whether the condition is satisfied,
wherein the condition is satisfied when at least one of:
the data store is accessed to read first data from the data store prior to the data store being accessed to write second data to the data store, or
the data store is accessed to write the second data to the data store prior to the data store being accessed to read the first data from the data store; and
transform a graphical display of the model to indicate one or more portions of the model associated with the identified pattern.

23. One or more non-transitory computer-readable storage media storing instructions, the instructions comprising:
  one or more instructions that when executed by one or more processors, cause the one or more processors to:
    generate an execution control graph that represents an execution of a model;
    the execution control graph including a plurality of nodes and a plurality of edges,
      the plurality of nodes corresponding to a plurality of blocks associated with a model, and
      the plurality of edges indicating at least one of:
        dependencies between blocks in the model, or
        hierarchical relationships between blocks in the model, and
      the execution control graph representing an execution of the model;
    analyze the plurality of edges in the execution control graph;
    determine, based on analyzing the plurality of edges in the execution control graph, an existence of a particular pattern associated with accessing a data store during the execution of the model,
      when determining the existence of the particular pattern, the processor being to:
        generate an expression based on:
          the execution control graph, and
          a condition,
            the condition representing a pattern with respect to accessing a data store during an execution of the model,
            the condition being at least one of:
              whether the data store is accessed to read first data from the data store prior to the data store being accessed to write second data to the data store, or
              whether the data store is accessed to write the second data to the data store prior to the data store being accessed to read the first data from the data store,
        determine whether the expression is satisifiable,
          the expression being satisfiable when:
            the data store is accessed to read the first data from the data store prior to the data store being accessed to write the second data to the data store, or
            the data store is accessed to write the second data to the data store prior to the data store being accessed to read the first data from the data store.

24. The non-transitory computer-readable storage media of claim 23, where the instructions further comprise:
  One or more instructions that, when executed by the one or more processors, cause the one or more processors to:
    transform, when the expression is satisfiable, at least one of a graphical display of the model or a graphical display of the execution control graph to indicate one or more portions of the model that are associated with the pattern.

* * * * *